(12) United States Patent
Mankovskii et al.

(10) Patent No.: US 8,266,477 B2
(45) Date of Patent: Sep. 11, 2012

(54) SYSTEM AND METHOD FOR MODIFYING EXECUTION OF SCRIPTS FOR A JOB SCHEDULER USING DEONTIC LOGIC

(75) Inventors: Serguei Mankovskii, Toronto (CA); Colin Banger, Kingston (CA); Jody Steele, Yarker (CA); Tomas Gray, Fort Coulonge (CA)

(73) Assignees: CA, Inc., Islandia, NY (US); Colin Banger, Kingston (CA); Jody Steele, Yarker (CA); Tomas Gray, Fort Coulonge (CA)

( * ) Notice: Subject to any disclaimer, the term of this patent is extended or adjusted under 35 U.S.C. 154(b) by 247 days.

(21) Appl. No.: 12/685,357

(22) Filed: Jan. 11, 2010

(65) Prior Publication Data

US 2010/0211815 A1    Aug. 19, 2010

Related U.S. Application Data

(60) Provisional application No. 61/143,572, filed on Jan. 9, 2009.

(51) Int. Cl.
*G06F 11/36* (2006.01)

(52) U.S. Cl. ............. 714/15; 714/2; 714/25; 714/38.1

(58) Field of Classification Search ............ 714/38.1, 714/25, 2, 15
See application file for complete search history.

(56) References Cited

U.S. PATENT DOCUMENTS

| | | | |
|---|---|---|---|
| 4,031,512 A | 6/1977 | Faber | 340/147 R |
| 4,318,173 A | 3/1982 | Freedman et al. | 364/200 |
| 4,323,966 A | 4/1982 | Whiteside et al. | 364/200 |
| 4,642,756 A | 2/1987 | Sherrod | 364/200 |
| 4,685,122 A | 8/1987 | Deveson et al. | 379/90 |
| 4,805,107 A | 2/1989 | Kieckhafer et al. | 364/200 |

(Continued)

FOREIGN PATENT DOCUMENTS

CA    2276240    11/1997

(Continued)

OTHER PUBLICATIONS

Pietzuch et al., "Peer-to-Peer Overlay Broker Networks in an Event-Based Middleware", *Distributed Event-Based Systems: Proceedings of the 2nd International Workshop on Distributed Event-Based Systems*, 08-08 Jun. 2003, 8 pages.

(Continued)

*Primary Examiner* — Chae Ko
(74) *Attorney, Agent, or Firm* — Pillsbury Winthrop Shaw Pittman LLP

(57) ABSTRACT

A system and method for modifying execution scripts associated with a job scheduler may include monitoring for the execution of a task to determine when the task has failed. Details of the failed task may be identified and used to attempt recovery from the task failure. After initiating any recovery tasks, execution of the recovery tasks may be monitored, and one or more supplementary recovery tasks may be identified and executed, or the original task may be rerun at an appropriate execution point based on the initial point of failure. Thus, when a task has failed, an iterative process may begin where various effects of the failed task are attempted to be rolled back, and depending on the success of the rollback, the initial task can be rerun at the point of failure, or further recovery tasks may be executed.

44 Claims, 10 Drawing Sheets

U.S. PATENT DOCUMENTS

| | | | |
|---|---|---|---|
| 4,855,899 A | 8/1989 | Present | 364/200 |
| 4,914,657 A | 4/1990 | Walter et al. | 371/11.3 |
| 4,969,092 A | 11/1990 | Shorter | 364/200 |
| 5,012,409 A | 4/1991 | Fletcher et al. | 364/200 |
| 5,303,369 A | 4/1994 | Borcherding et al. | 395/650 |
| 5,371,887 A | 12/1994 | Yoshida et al. | 395/650 |
| 5,414,845 A | 5/1995 | Behm et al. | 395/650 |
| 5,418,953 A | 5/1995 | Hunt et al. | 395/650 |
| 5,487,170 A | 1/1996 | Bass et al. | 395/732 |
| 5,495,610 A | 2/1996 | Shing et al. | 395/600 |
| 5,655,081 A | 8/1997 | Bonnell et al. | 395/200.32 |
| 5,701,439 A | 12/1997 | James et al. | 395/500 |
| 5,781,775 A | 7/1998 | Ueno | 395/672 |
| 5,787,280 A | 7/1998 | Joseph et al. | 395/619 |
| 5,812,849 A | 9/1998 | Nykiel et al. | 395/701 |
| 5,826,104 A | 10/1998 | Rifkin | 395/835 |
| 5,862,386 A | 1/1999 | Joseph et al. | 395/712 |
| 5,872,970 A | 2/1999 | Pickett et al. | 395/671 |
| 5,881,283 A | 3/1999 | Hondou et al. | 395/670 |
| 5,881,284 A | 3/1999 | Kubo | 395/675 |
| 5,901,313 A | 5/1999 | Wolf et al. | 395/682 |
| 5,907,705 A | 5/1999 | Carter | 395/701 |
| 5,940,813 A | 8/1999 | Hutchings | 705/43 |
| 5,978,594 A | 11/1999 | Bonnell et al. | 395/837 |
| 6,014,760 A | 1/2000 | Silva et al. | 714/46 |
| 6,029,178 A | 2/2000 | Martin et al. | 707/201 |
| 6,035,278 A | 3/2000 | Mansour | 705/9 |
| 6,035,307 A | 3/2000 | Martin et al. | 707/203 |
| 6,035,419 A * | 3/2000 | Breslau et al. | 714/20 |
| 6,065,123 A | 5/2000 | Chou et al. | 713/322 |
| 6,076,174 A | 6/2000 | Freund | 714/47 |
| 6,097,886 A | 8/2000 | Dave et al. | 395/500.44 |
| 6,105,148 A * | 8/2000 | Chung et al. | 714/16 |
| 6,112,023 A | 8/2000 | Dave et al. | 395/500.48 |
| 6,141,412 A | 10/2000 | Smith et al. | 379/265 |
| 6,151,707 A | 11/2000 | Hecksel et al. | 717/11 |
| 6,154,878 A | 11/2000 | Saboff | 717/11 |
| 6,178,542 B1 | 1/2001 | Dave | 716/18 |
| 6,195,699 B1 | 2/2001 | Dennis | 709/229 |
| 6,205,122 B1 | 3/2001 | Sharon et al. | 370/254 |
| 6,253,236 B1 | 6/2001 | Troxel et al. | 709/217 |
| 6,263,359 B1 | 7/2001 | Fong et al. | 709/103 |
| 6,263,377 B1 | 7/2001 | Monday et al. | 709/320 |
| 6,314,428 B1 | 11/2001 | Brew et al. | 707/103 |
| 6,323,882 B1 | 11/2001 | Jerome et al. | 345/744 |
| 6,324,578 B1 | 11/2001 | Cox et al. | 709/223 |
| 6,336,217 B1 | 1/2002 | D'Anjou et al. | 717/11 |
| 6,338,149 B1 | 1/2002 | Ciccone, Jr. et al. | 714/38 |
| 6,393,605 B1 | 5/2002 | Loomans | 717/121 |
| 6,427,170 B1 | 7/2002 | Sitaraman et al. | 709/226 |
| 6,430,594 B1 | 8/2002 | Akiyama et al. | 709/108 |
| 6,449,739 B1 | 9/2002 | Landan | 714/47 |
| 6,457,049 B2 | 9/2002 | Lewis et al. | 709/223 |
| 6,457,170 B1 | 9/2002 | Boehm et al. | 717/106 |
| 6,480,834 B1 | 11/2002 | Engle et al. | 707/2 |
| 6,493,594 B1 | 12/2002 | Kraml | 700/19 |
| 6,510,466 B1 | 1/2003 | Cox et al. | 709/229 |
| 6,516,318 B2 | 2/2003 | Nakamura et al. | 707/10 |
| 6,546,364 B1 | 4/2003 | Smirnov et al. | 703/22 |
| 6,546,387 B1 | 4/2003 | Triggs | 707/5 |
| 6,550,024 B1 | 4/2003 | Pagurek et al. | 714/47 |
| 6,591,290 B1 | 7/2003 | Clarisse et al. | 709/205 |
| 6,591,413 B1 | 7/2003 | Humphrey et al. | 717/125 |
| 6,606,529 B1 | 8/2003 | Crowder, Jr. et al. | 700/100 |
| 6,678,682 B1 | 1/2004 | Jenkins et al. | 707/9 |
| 6,691,067 B1 | 2/2004 | Ding et al. | 702/186 |
| 6,691,125 B1 | 2/2004 | Engle et al. | 707/102 |
| 6,718,486 B1 * | 4/2004 | Roselli et al. | 714/41 |
| 6,721,778 B1 | 4/2004 | Smith et al. | 709/103 |
| 6,738,806 B1 | 5/2004 | Maryka et al. | 709/220 |
| 6,738,813 B1 | 5/2004 | Reichman | 709/224 |
| 6,748,451 B2 | 6/2004 | Woods et al. | 709/248 |
| 6,757,689 B2 | 6/2004 | Battas et al. | 707/101 |
| 6,769,120 B1 | 7/2004 | Rodriguez | 718/100 |
| 6,772,411 B2 | 8/2004 | Hayes et al. | 717/127 |
| 6,779,028 B1 | 8/2004 | Nakamura | 709/223 |
| 6,801,926 B1 | 10/2004 | Shisler et al. | 709/201 |
| 6,809,251 B2 | 10/2004 | Dinwoodie | 136/251 |
| 6,847,970 B2 | 1/2005 | Keller et al. | 707/100 |
| 6,868,542 B1 | 3/2005 | Hebert et al. | 719/316 |
| 6,889,243 B1 | 5/2005 | Hondou et al. | 709/100 |
| 6,895,586 B1 | 5/2005 | Brasher et al. | 719/313 |
| 6,901,435 B1 | 5/2005 | Sulcer et al. | 709/219 |
| 6,915,285 B2 | 7/2005 | Gray et al. | 706/49 |
| 6,922,827 B2 | 7/2005 | Vasilik et al. | 717/140 |
| 6,925,482 B2 | 8/2005 | Gopal et al. | 709/201 |
| 6,934,931 B2 | 8/2005 | Plumer et al. | 717/104 |
| 6,934,949 B2 | 8/2005 | Smith et al. | 718/101 |
| 6,944,630 B2 | 9/2005 | Vos et al. | 707/104.1 |
| 6,971,094 B1 | 11/2005 | Ly | 717/172 |
| 6,976,133 B1 | 12/2005 | Wynn et al. | 711/147 |
| 6,983,321 B2 | 1/2006 | Trinon et al. | 709/224 |
| 6,986,135 B2 | 1/2006 | Leathers et al. | 717/177 |
| 6,993,763 B2 | 1/2006 | Hayes, Jr. | 718/102 |
| 6,996,576 B2 | 2/2006 | Vos et al. | 707/103 |
| 6,996,601 B1 | 2/2006 | Smith | 709/203 |
| 7,020,880 B2 | 3/2006 | Mellen-Garnett et al. | 719/310 |
| 7,055,170 B1 | 5/2006 | Karmouch et al. | 726/2 |
| 7,082,604 B2 | 7/2006 | Schneiderman | 718/100 |
| 7,082,605 B2 | 7/2006 | Alletson et al. | 718/100 |
| 7,240,015 B1 | 7/2007 | Karmouch et al. | 705/4 |
| 7,240,324 B2 | 7/2007 | Casati et al. | 717/103 |
| 7,404,189 B2 | 7/2008 | Benedetti | 719/317 |
| 7,472,905 B2 | 1/2009 | Inoue | 271/227 |
| 7,650,347 B2 | 1/2010 | Mankovski et al. | 707/100 |
| 7,657,450 B2 | 2/2010 | Amit et al. | 705/7 |
| 8,171,474 B2 | 5/2012 | Mankovski | 718/100 |
| 2001/0018708 A1 | 8/2001 | Shisler et al. | 709/220 |
| 2001/0028368 A1 | 10/2001 | Swartz et al. | 345/835 |
| 2001/0032263 A1 | 10/2001 | Gopal et al. | 709/227 |
| 2001/0042131 A1 | 11/2001 | Mathon et al. | 709/238 |
| 2001/0049595 A1 | 12/2001 | Plumer et al. | 703/22 |
| 2002/0002578 A1 | 1/2002 | Yamashita | 709/105 |
| 2002/0007297 A1 | 1/2002 | Clarke | 705/8 |
| 2002/0023122 A1 | 2/2002 | Polizzi et al. | 709/202 |
| 2002/0049815 A1 | 4/2002 | Dattatri | 709/206 |
| 2002/0082891 A1 | 6/2002 | McKay et al. | 705/8 |
| 2002/0107957 A1 | 8/2002 | Zargham et al. | 709/224 |
| 2002/0124245 A1 | 9/2002 | Maddux et al. | 717/176 |
| 2002/0129035 A1 | 9/2002 | Hayes et al. | 707/104.1 |
| 2002/0129129 A1 | 9/2002 | Bloch et al. | 709/220 |
| 2002/0133622 A1 | 9/2002 | Pinto | 709/242 |
| 2002/0143669 A1 | 10/2002 | Scheer | 705/28 |
| 2002/0143920 A1 | 10/2002 | Dev et al. | 709/223 |
| 2002/0161674 A1 | 10/2002 | Scheer | 705/28 |
| 2002/0161814 A1 | 10/2002 | Wical | 709/101 |
| 2002/0165903 A1 | 11/2002 | Zargham et al. | 709/202 |
| 2002/0165976 A1 | 11/2002 | Gonthier et al. | 709/237 |
| 2002/0178262 A1 | 11/2002 | Bonnell et al. | 709/225 |
| 2002/0178349 A1 * | 11/2002 | Shibayama et al. | 712/235 |
| 2002/0184070 A1 | 12/2002 | Chen et al. | 705/9 |
| 2002/0184575 A1 | 12/2002 | Landan | 714/47 |
| 2002/0198923 A1 | 12/2002 | Hayes, Jr. | 709/102 |
| 2003/0009463 A1 | 1/2003 | Gallant | 707/10 |
| 2003/0018509 A1 | 1/2003 | Ossip et al. | 705/9 |
| 2003/0018510 A1 | 1/2003 | Sanches | 705/9 |
| 2003/0018763 A1 | 1/2003 | Doherty et al. | 709/223 |
| 2003/0046681 A1 | 3/2003 | Barturen et al. | 717/177 |
| 2003/0101279 A1 | 5/2003 | Maheshwari | 709/241 |
| 2003/0120704 A1 | 6/2003 | Tran et al. | 718/104 |
| 2003/0126181 A1 | 7/2003 | Young | 709/100 |
| 2003/0126303 A1 | 7/2003 | Kadakia et al. | 709/313 |
| 2003/0163511 A1 | 8/2003 | Smith et al. | 709/101 |
| 2003/0163799 A1 | 8/2003 | Vasilik et al. | 717/100 |
| 2003/0182652 A1 | 9/2003 | Custodio | 717/122 |
| 2003/0188290 A1 | 10/2003 | Corral | 717/101 |
| 2003/0191679 A1 | 10/2003 | Casati et al. | 705/8 |
| 2003/0191795 A1 | 10/2003 | Bernardin et al. | 708/105 |
| 2003/0200098 A1 | 10/2003 | Geipel et al. | 705/1 |
| 2003/0220860 A1 | 11/2003 | Heytens et al. | 705/35 |
| 2004/0028077 A1 * | 2/2004 | Gray et al. | 370/466 |
| 2004/0060035 A1 | 3/2004 | Ustaris | 717/100 |
| 2004/0073900 A1 | 4/2004 | Scott | 717/170 |
| 2004/0107179 A1 | 6/2004 | Dalrymple, III et al. | 707/1 |
| 2004/0107199 A1 | 6/2004 | Dalrymple, III et al. | 707/100 |
| 2004/0117802 A1 | 6/2004 | Green | 719/318 |
| 2004/0123296 A1 | 6/2004 | Challenger et al. | 718/102 |

| | | | | |
|---|---|---|---|---|
| 2004/0148184 A1 | 7/2004 | Sadiq ................................ 705/1 | WO | WO 01/20918 3/2001 |
| 2004/0177108 A1 | 9/2004 | Connelly et al. ............... 709/201 | WO | WO 02/23434 3/2002 |
| 2004/0177355 A1 | 9/2004 | Wragge ........................ 717/174 | WO | WO 02/063530 8/2002 |
| 2004/0181425 A1 | 9/2004 | Schwerin-Wenzel et al. .... 705/1 | | |
| 2004/0187108 A1 | 9/2004 | Knowles et al. ............. 718/100 | | |
| 2004/0216098 A1 | 10/2004 | Roe et al. ...................... 717/161 | | |
| 2004/0230828 A1 | 11/2004 | DeFuria et al. ............... 713/200 | | |
| 2004/0237087 A1 | 11/2004 | Ye et al. ........................ 718/101 | | |
| 2005/0010608 A1 | 1/2005 | Horikawa ..................... 707/200 | | |
| 2005/0015437 A1 | 1/2005 | Strait ............................ 709/203 | | |
| 2005/0015511 A1 | 1/2005 | Izmailov et al. .............. 709/238 | | |
| 2005/0015619 A1 | 1/2005 | Lee ..................................... 726/4 | | |
| 2005/0039132 A1 | 2/2005 | Germain et al. ............. 715/736 | | |
| 2005/0044173 A1 | 2/2005 | Olander et al. ............... 709/217 | | |
| 2005/0049923 A1 | 3/2005 | Tanaka et al. ................... 705/18 | | |
| 2005/0071818 A1 | 3/2005 | Reissman et al. ............. 717/127 | | |
| 2005/0081186 A1 | 4/2005 | Tigani et al. .................. 717/104 | | |
| 2005/0097146 A1 | 5/2005 | Konstantinou et al. ....... 707/200 | | |
| 2005/0097545 A1 | 5/2005 | Tarbox et al. ................. 717/176 | | |
| 2005/0108700 A1 | 5/2005 | Chen et al. .................... 717/168 | | |
| 2005/0108702 A1 | 5/2005 | Baker et al. ................... 717/168 | | |
| 2005/0114039 A1 | 5/2005 | Kennedy et al. ................ 702/19 | | |
| 2005/0131865 A1 | 6/2005 | Jones et al. ........................ 707/2 | | |
| 2005/0160074 A1 | 7/2005 | Vos et al. ........................... 707/1 | | |
| 2005/0160104 A1 | 7/2005 | Meera et al. .................. 707/100 | | |
| 2005/0210099 A1 | 9/2005 | Oswalt .......................... 709/203 | | |
| 2005/0216486 A1 | 9/2005 | Barshefsky et al. .......... 707/100 | | |
| 2005/0216555 A1 | 9/2005 | English et al. ................ 709/204 | | |
| 2005/0257216 A1 | 11/2005 | Cornell et al. ................ 717/177 | | |
| 2005/0257221 A1 | 11/2005 | Inchingolo et al. ........... 718/100 | | |
| 2005/0262076 A1 | 11/2005 | Voskuil ............................ 707/8 | | |
| 2005/0262501 A1 | 11/2005 | Marinelli et al. ............. 717/174 | | |
| 2005/0278703 A1 | 12/2005 | Lo et al. ........................ 717/126 | | |
| 2006/0010123 A1 | 1/2006 | Sonkin et al. ..................... 707/4 | | |
| 2006/0095914 A1 | 5/2006 | Mankovski .................... 718/100 | | |
| 2007/0006195 A1* | 1/2007 | Braun et al. ................... 717/151 | | |
| 2007/0266390 A1 | 11/2007 | Emmerich ..................... 718/105 | | |
| 2007/0288412 A1* | 12/2007 | Linehan ........................... 706/45 | | |
| 2008/0263195 A1* | 10/2008 | Kroll et al. .................... 709/224 | | |
| 2008/0307420 A1 | 12/2008 | Benedetti ...................... 718/102 | | |

FOREIGN PATENT DOCUMENTS

| | | |
|---|---|---|
| CH | 306782 | 4/1955 |
| WO | WO 01/16753 | 3/2001 |

OTHER PUBLICATIONS

Barbuceanu, Mihai, et al., "Coordinating with Obligations", University of Toronto, and Mitel Corporation, Sep. 30, 1997, 19 pages.

Dint, Petre, et al., "Policy-Enabled Mechanisms for Feature Interactions: Reality, Expectations, Challenges", *Computer Networks*, vol. 45, 2004, pp. 585-603.

Kretschmer, Martin, "Software as Text and Machine: The Legal Capture of Digital Innovation", *Journal of Information, Law and Technology*, Issue 1, Jul. 4, 2003, 23 pages.

Tcherevik, Dmitri, "A Publish/Subscribe Mechanism for Web Services: Extending an Existing Event Broker", *Web Services Journal*, copyright 2004, SYS-CON Media, Inc., 8 pages.

"Web Services Choreography Requirements", W3C Working Draft, Mar. 11, 2004, W3C, 26 pages.

"PADRES: A Distributed Content-Based Publish/Subscribe System for Workflow Management", University of Toronto and Cybermation Inc., Nov. 19, 2004, 20 pages.

Schwartz M., et al., "The APEX Publish-Subscribe Service", Network Working Group, Internet-Draft, Oct. 23, 2001, The Internet Society, 17 pages.

Buhr, R.J.A., et al., "Feature-Interaction Visualization and Resolution in an Agent Environment", Carleton University and Mitel Corporation, *Fifth International Workshop on Feature Interactions* (FIW98), Sweden, Sep. 1998, 15 pages.

"Enterprise Resource Planning", definition from Wikipedia, 8 pages, Feb. 23, 2012.

"BPEL—a Whatis.com definition", searchWebServices.com definitions, Feb. 23, 2005, 2 pages.

Wieringa, R.J., et al., Applications of Deontic Logic in Computer Science: A Concise Overview, *Deontic Logic in Computer Science*, 17-40, John Wiley & Sons, Chichester, England, 1993, 28 pages.

Van Der Torre, Leendert W.N., "Violated Obligations in a Defeasible Deontic Logic", ECAI 94, *11th European Conference on Artificial Intelligence*, edited by A. Cohn, 1994, John Wiley & Sons, Ltd., pp. 371-375.

* cited by examiner

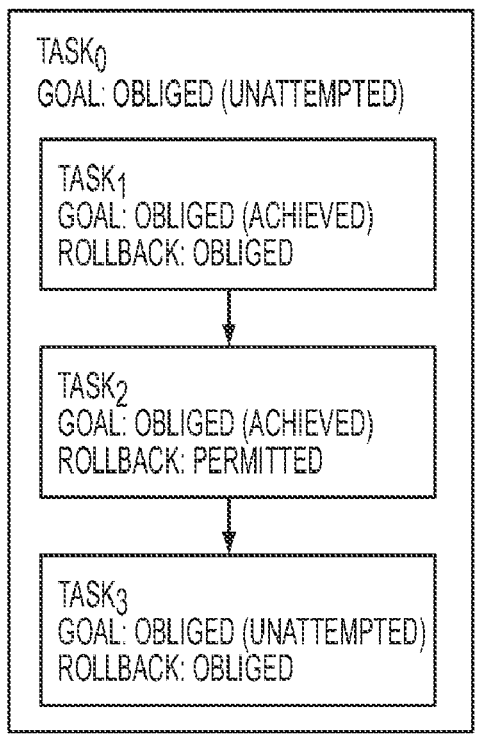 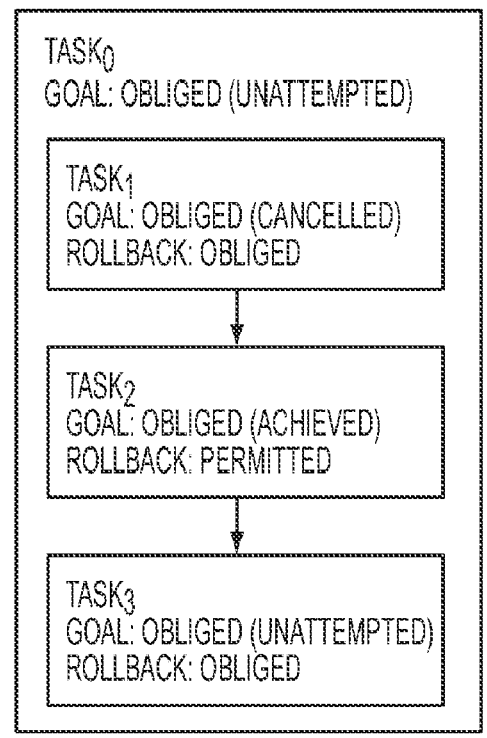
FIG. 3A  FIG. 3B
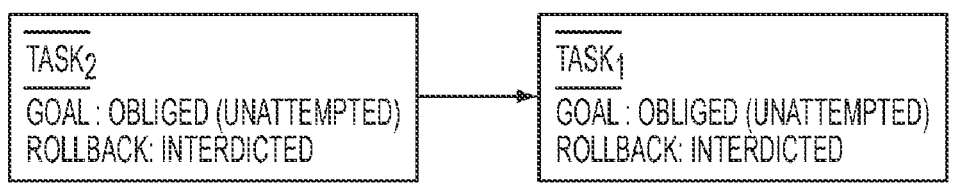
FIG. 3C

SYSTEM AND METHOD FOR MODIFYING EXECUTION OF SCRIPTS FOR A JOB SCHEDULER USING DEONTIC LOGIC

CROSS-REFERENCE TO RELATED APPLICATIONS

This application claims the benefit of U.S. Provisional Patent Application Ser. No. 61/143,572, entitled "System and Method for Modifying Execution of Scripts for a Job Scheduler Using Deontic Logic," filed Jan. 9, 2009, the contents of which are hereby incorporated by reference in their entirety.

FIELD OF THE INVENTION

The invention relates to a system and method for processing, tracking, and modifying execution of scripts for a job scheduler, and in particular, to using a deontic rollback and rerun engine to supervise dynamic creation of one or more additional execution scripts to undo and redo one or more jobs that may have failed to complete for a given job schedule.

BACKGROUND OF THE INVENTION

Job scheduling systems typically provide centralized hardware and software facilities to process large scale, distributed tasks. Existing job scheduling systems tend to break down large scale tasks into several different component jobs, which can then be executed individually, sequentially, in parallel, or otherwise, depending on a master schedule defined for the overall tasks. For example, a job scheduling system may be used to schedule a task that relates to booking a travel plan. In such an example, the job scheduling system may perform the task for booking the travel plan according to a schedule of component jobs, which may include booking a flight, booking a hotel, and booking a rental car, among other things. Depending on the nature of a given job scheduling system, each of the component jobs in a task schedule may be managed using different machines connected to the job scheduling system through one or more networks. When processing task schedules that often include different component jobs, which may be managed using many different machines or systems, which may be further distributed in any number of ways, external events can often cause one or more of the jobs in the schedule to fail, potentially causing significant impact to the results of the entire task schedule. For example, after all of the bookings have been made for a travel plan as described in the task schedule mentioned above, a change to just one of the bookings in the travel plan may require new bookings for some or all of the remaining bookings (e.g., a cancellation of the flight booking may require not only a new flight booking, but also new bookings for the hotel, rental car, or other components of the travel schedule).

However, existing job scheduling systems do not adequately process dynamic changes or handle error recovery in cases such as the exemplary scenario described above. Rather, existing job scheduling systems tend to only have rudimentary, hard-coded recovery techniques to deal with such failures. For example, traditional event-driven job scheduling systems (e.g., enterprise job scheduling systems, business process execution systems, workflow execution systems, etc.) have the tendency to control and monitor the execution of large scale tasks by scheduling component jobs in response to the occurrence of various events (e.g., job completion events, changes in an immediate scheduling environment, system events, etc.). Error recovery routines in these types of systems are typically embedded within process descriptions at design time, and the routines are then invoked as necessary at execution time in order to automate error recovery processes. In many cases, however, it will be extremely difficult to anticipate every possible source of failure, and moreover, existing job scheduling systems require detailed analysis of log information at execution time to correctly identify appropriate recovery measures. However, existing job scheduling systems do not easily automate such analysis, which may result in error recovery being a task better suited for human experts to handle in existing job scheduling systems.

Accordingly, for at least the reasons given above, existing job scheduling systems suffer from various problems and drawbacks, including the inability to automate recovery when failure of one or more jobs in a task schedule occurs.

SUMMARY OF THE INVENTION

According to one aspect of the invention, a system and method for executing a schedule that includes a plurality of linked jobs may be provided. In particular, executing the schedule may comprise scheduling execution of each of the plurality of linked jobs to attempt completion of the schedule, and selectively initiating at least one of the jobs according to the schedule, wherein the at least one initiated job has a goal and an assertion related to the goal. A log report containing a value for the assertion may be generated for the initiated job, wherein the value for the assertion in the log report may be based on a completion status for the selectively initiated job.

In one implementation, once the log report has been generated, the value for the assertion contained therein may be analyzed to determine whether the assertion has been achieved. If the assertion has been achieved and the assertion is interdicted from being achieved for the goal, one or more jobs to unachieve (or rollback) the goal may be identified. The rollback jobs may be associated with one or more respective assertions, and the rollback jobs may then be executed. Values for the assertions associated with the rollback jobs may be generated and analyzed. One or more jobs to reachieve (or rerun) the goal may then be identified and executed if the values for the assertions associated with the rollback jobs indicate that the rollback jobs have been achieved and if the goal is interdicted from being achieved.

According to one aspect of the invention, a system for modifying execution of one or more scripts for a job scheduler using deontic logic may comprise a job scheduler configured to execute a schedule that includes at least one task having a goal associated therewith. In one implementation, the goal may further have a deontic modality associated therewith, wherein the job scheduler may create one or more event logs containing information relating to the execution of the at least one task. The system may further include a rollback and rerun supervisor communicatively coupled to the job scheduler. In particular, the rollback and rerun supervisor may be configured to access the one or more event logs to determine whether the at least one task succeeded or failed based on whether the goal has been achieved in a manner consistent with the deontic modality. Upon determining that the task failed to achieve the goal in a manner consistent with the deontic modality for the goal, the rollback and rerun supervisor may determine at least one deontic modality associated with recovering from failure of the task. As such, the rollback and rerun supervisor may load a recovery script to the job scheduler based on the deontic modality associated with recovering from failure of the task, wherein the recovery script loaded to the job scheduler may include a task description designed to achieve the goal in a manner consistent with the deontic modality.

According to one aspect of the invention, a method for modifying execution of one or more scripts for a job scheduler using deontic logic may comprise executing a schedule that includes at least one composite task, wherein the composite task may include a plurality of dependent sub-tasks arranged in a predetermined relationship that defines a manner for executing the plurality of dependent sub-tasks. One or more execution event logs containing information relating to the execution of the plurality of dependent sub-tasks may be created, whereby success or failure of the composite task may be determined based on the information in the execution event logs. In particular, the composite task may be determined to have succeeded if the execution event logs indicate that the plurality of dependent sub-tasks completed execution in a manner consistent with the predetermined relationship defined for the plurality of dependent sub-tasks.

Other objects and advantages of the invention will be apparent to those skilled in the art based on the following drawings and detailed description.

BRIEF DESCRIPTION OF THE DRAWINGS

FIGS. 3a-c illustrate an exemplary upstream goal cancellation scenario for a completed task, according to one aspect of the invention.

DETAILED DESCRIPTION

Figure 1:
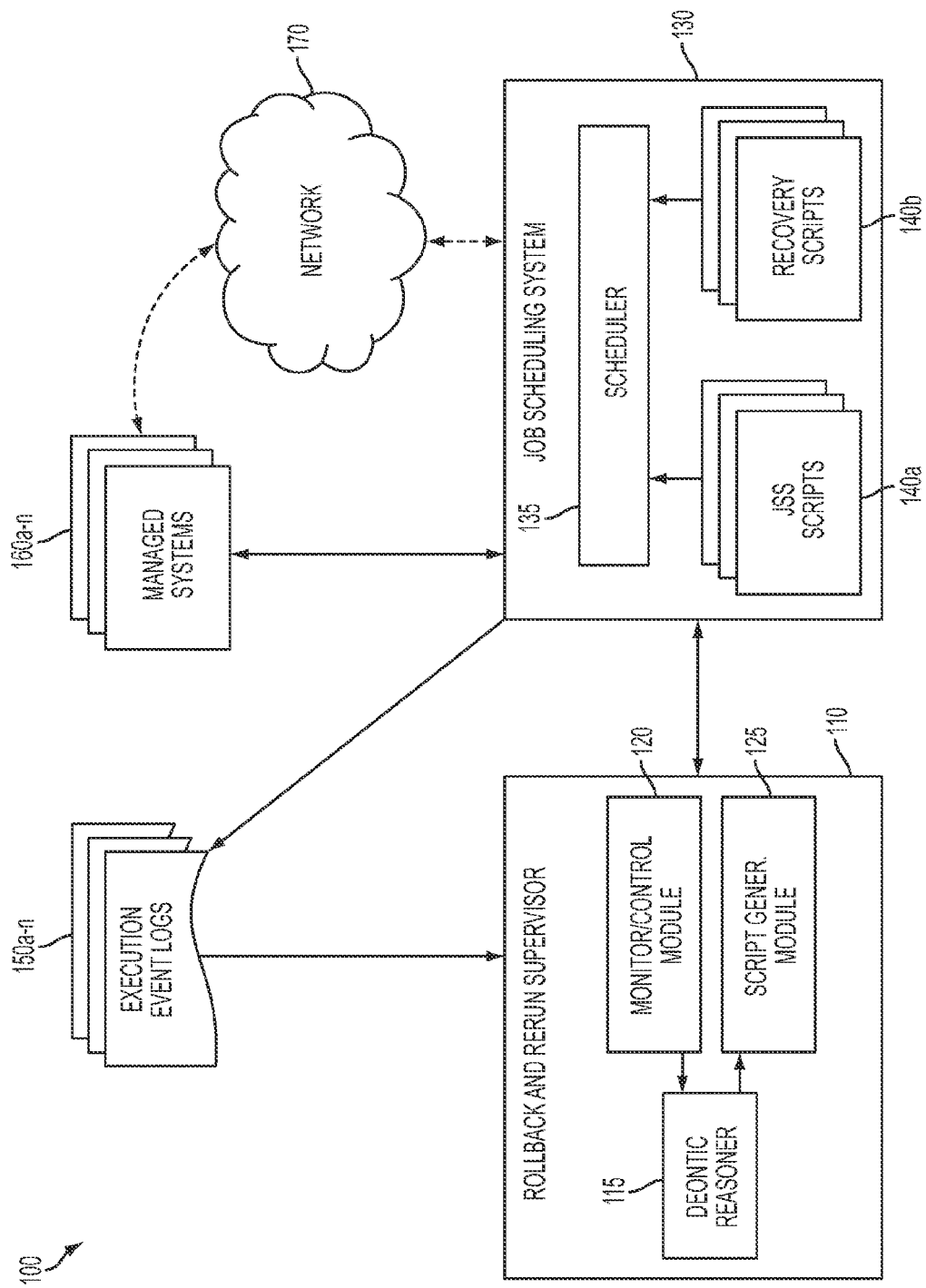
FIG. 1 illustrates a block diagram of an exemplary system for modifying execution of scripts for a job scheduler using deontic logic, according to one aspect of the invention.

According to various aspects of the invention, as illustrated in FIG. 1, for example, an exemplary system 100 for modifying execution of scripts for a job scheduler using deontic logic may be used to automate various job scheduling processes. In particular, the system 100 illustrated in FIG. 1 may simplify and automate certain, forms of failure recovery, including rollback and rerun, among other things. The system 100 illustrated in FIG. 1 may include, among other things, a rollback and rerun supervisor (RRS) 110 that automates usage of a job scheduling system (JSS) 130 (e.g., via an application program interface). As will be apparent, the job scheduling system 130 may include any suitable event-driven job scheduler 135 capable of scheduling and managing various jobs associated with a given task.

In one implementation, the rollback and rerun supervisor 110 may include a monitor and control module 120 for monitoring and controlling the job scheduling system 130. For example, the monitor and control module 120 may be configured to receive one or more execution event logs 150a-n created by the job scheduling system 130 to monitor events associated with the job scheduling system 130. The rollback and rerun supervisor 110 may further include a script generating module 125 for loading one or more scripts to the job scheduling system 130. As will be apparent, the scripts may include descriptions of various processes to be carried out by the job scheduling system 130, with each particular script describing a logical unit of work.

As a plurality of jobs comprising a given task are scheduled in the job scheduling system 130, the rollback and rerun supervisor 110 may monitor the overall execution status of the schedule (e.g., via the monitor and control module 120). If the rollback and rerun supervisor 110 detects a failed job or task within a schedule executed in the job scheduling system 130, the rollback and rerun supervisor 110 may halt the job scheduling system 130 and generate a recovery script using the script generating module 125. In one implementation, the recovery script may be generated for the particular purpose of recovering from the failure of the job or task in the schedule. The rollback and rerun supervisor 110 may load the recovery script to the job scheduling system 130, and the job scheduling system 130 may then schedule execution of the recovery script using the scheduler 135. When execution of the recovery script has completed in the job scheduling system 130, the job scheduling system 130 may reload a script associated with the previously failed schedule and resume execution thereof.

As such, the rollback and rerun supervisor 110 may be used to dynamically configure descriptions of a scheduled task in a manner that adapts to unexpected or undesired occurrences during execution of the task. In addition, the rollback and rerun supervisor 110 may automate various processes associated with failure recovery that would often otherwise require human intervention in existing job scheduling systems. For example, in one implementation, human intervention may be reduced by providing an appropriate pool of recovery scripts 140b, which the rollback and rerun supervisor 110 can invoke when necessary to maintain integrity over a workflow or other schedule that includes the failed task.

In one implementation, the rollback and rerun supervisor 110 may access one or more execution event log 150a-n relating to a plurality of jobs defined within a script 140a being executed within the job scheduling system 130. The rollback and rerun supervisor 110 may analyze the event logs 150a-n to identify whether any of the jobs have completed, partially completed, or failed. Depending on the contents of the execution event log 150 for a given job, corrective action may need to be taken for the job. In one implementation, depending on the results of the corrective action, supplementary corrective action may be identified and executed, or the original job may be reinitiated at an appropriate execution point, based on the initial point of failure. For example, when a job has been identified as failing, an iterative process may be started in which effects of the failed job may be undone or rolled back. Subsequently, depending on the success of undoing or rolling back the failed job, the initial job can be reinitiated at the point of failure, or further undo or rollback action may be taken.

In one implementation, the rollback and rerun supervisor 110 may use a deontic reasoning engine 115 and provide a library of recovery scripts 140b to handle various forms of failure that may occur asynchronously during execution of a job scheduling system script 140a. In various implementations, the job scheduling system 130 may be configured to execute any suitable task or job schedule, including business processes, network monitoring and security, or remote monitoring and control of real-time systems, among others. The rollback and rerun supervisor 110 may thus provide flexibility in recovering from failure associated with a given job schedule. For example, to enable recovery from the failure, the rollback and rerun supervisor 110 may generate a script that includes a schedule to perform one or more jobs to rollback, rerun, compensate, and/or provide alternative job choices in relation to the failure, as described in greater below.

In one implementation, the job scheduling system 130 may be configured to perform various job schedules to carry out various native processes, such as business processes or business-related tasks. For example, in one implementation, the job scheduling system 130 may be configured to schedule executable business processes, which may be defined using Business Process Execution Language (BPEL). As such, in one implementation, the rollback and rerun supervisor 110 and/or the job scheduling system 130 may provide failure recovery capabilities through compensation handling features associated with BPEL, or through other failure recovery mechanisms associated with the native processes executed in the job scheduling system 130. For example, systems based on BPEL may include various fault handlers and compensation handlers statically "hard-wired" into BPEL process descriptions, which may be used to reverse one or more effects of a BPEL script 140*a*. In general, the native fault handlers and compensation handlers associated with BPEL may be applied to an individual scope (i.e., a logical unit of work within a script 140*a*) or an entire scope (i.e., all units of the work within the script 140*a*).

In addition to the native failure recovery mechanisms of the job scheduling system 130, the rollback and rerun supervisor 110 may be configured to create recovery scripts 140*b* to compensate for various further failure scenarios, including scenarios where the failure impacts only a portion of a scope, multiple scopes, or various other permutations. Thus, rather than being restricted or otherwise limited to any particular scope or process, the rollback and rerun supervisor 110 may support failure recovery through dynamic creation, composition, and configuration of generic recovery scripts in a recovery script library 140*b*. In one implementation, dynamically creating, composing, and otherwise configuring recovery scripts from a pool of multiple recovery scripts may allow the generic component scripts in the recovery script library 140*b* to be relatively simple, as dynamic configuration of the recovery scripts in the library 140*b* may reduce complexity of recovery script definition.

In one implementation, the rollback and rerun supervisor 110 may generate various scripts from the recovery script library 140*b* using the script generating module 125. The rollback and rerun supervisor 110 may then load the generated scripts into the job scheduling system 130, and use the monitor and control module 120 to monitor process execution in the job scheduling system 130. In particular, the job scheduling system 130 may schedule one or more job scheduling system scripts 140*a* using the scheduler 135, thereby scheduling one or more jobs as defined in the scripts 140*a*, and the scheduled jobs may then be executed using one or more managed systems 160*a-n*. In one implementation, one or more of the managed systems 160 may be locally coupled to the job scheduling system 130, and one or more of the managed systems 160 may be remotely coupled to the job scheduling system 130 through a network 170 (via the dashed line illustrated in FIG. 1).

As the managed systems 160 execute the scheduled jobs, the job scheduling system 130 may log occurrences of key events (e.g., job termination events) within the execution event logs 150. Thus, the rollback and rerun supervisor 110 may receive information contained in the execution event logs 150 and use such information to monitor activity of the job scheduling system 130. Based on the information in the execution event logs 150, the rollback and rerun supervisor 110 may manage recovery from any failures that may have occurred during execution of a given process in the job scheduling system 130. For example, in one implementation, the rollback and rerun supervisor 110 may assess an execution state of a failed process at the time of failure and automatically generate a recovery script using the script generating module 125. The recovery script may then be loaded and scheduled for execution in the job scheduling system 130.

As indicated above, the job scheduling system 130 may include a library having various job scheduling system scripts 140*a* and various recovery scripts 140*b*, which may be scheduled or otherwise processed using the job scheduler 135. As will be apparent, the job scheduling system scripts 140*a* may include any suitable text-based process descriptions that specify scheduling dependencies within a given process, and may be written in any suitable language native to the job scheduling system 130 (e.g., ESPresso, BPEL, etc.). The job scheduler 135 may interpret the job scheduling system scripts 140*a* and trigger execution of any jobs specified therein for execution on a set of various managed systems 160. Depending on the scheduling dependencies specified in the script 140*a*, the jobs may be scheduled in sequence or in parallel.

As will be described in greater detail below, the recovery scripts 140*b* may generally be similar to the job scheduling system scripts 140*a* in that the recovery scripts 140*b* may include text-based process descriptions written in the native language of the job scheduling system 130. Furthermore, the recovery scripts 140*b* may be augmented with metadata that the rollback and rerun supervisor 110 can use to monitor and control execution of the recovery scripts 140*b*. In one implementation, the metadata associated with the recovery scripts 140*b* may appear as structured comment fields within the text of the recovery scripts 140*b*.

In one implementation, the rollback and rerun supervisor 110 and the job scheduling system 130 may be communicatively coupled to one another via an interface, which may enable the rollback and rerun supervisor 110 to manage execution of various processes in the job scheduling system 130 (e.g., scheduling execution, rollback, rerun, and/or other processes for various tasks, jobs, etc.). For example, the interface between the job scheduling system 130 and the rollback and rerun supervisor 110 may enable the rollback and rerun supervisor 110 to add new recovery scripts to the recovery script library 140*b*, copy scripts from either or both of the script libraries 140*a-b*, load recovery scripts from the recovery script library 140*b* into the scheduler 135, and/or halt execution of the recovery scripts, among other things.

Furthermore, in one implementation, the interface between the rollback and rerun supervisor 110 and the job scheduling system 130 may provide a procedure through which the job scheduling system 130 can request permission to initiate execution of one or more subsequently scheduled tasks. For example, the job scheduling system 130 may request permission to initiate execution of the subsequent tasks from the rollback and rerun supervisor 110. The rollback and rerun supervisor 110 may then check a current state of the execution event logs 150 to determine whether or not to grant the permission. For instance, the rollback and rerun supervisor 110 may deny the request of the job scheduling system 130 if the current state of the execution event logs 150 indicates that rollback and/or rerun is necessary for one or more currently or previously executed tasks, or the rollback and rerun supervisor 110 may grant the job scheduling system 130 permission to initiate the subsequent tasks if the current state of the execution event logs 150 indicates that rollback and/or rerun is unnecessary.

When the rollback and rerun supervisor 110 loads a recovery script from the recovery script library 140b into the scheduler 135 of the job scheduling system 130, the rollback and rerun supervisor 110 may generate a copy of any metadata associated with the loaded recovery script. As execution of a script from the job scheduling system script library 140a occurs in the job scheduling system 130, a sequence of entries may be generated and recorded in one or more execution event logs 150. For example, in one implementation, the entries in the execution event logs 150 may include information indicating an overall execution status of the job scheduling system script 140a, including one or more jobs scheduled therein.

The rollback and rerun supervisor 110 may then read the entries in the execution event logs 150 and compare the entries to the copy of the metadata associated with the recovery script to determine whether the script under execution has failed. If the rollback and rerun supervisor 110 detects a failure in the execution of the script, the rollback and rerun supervisor 110 may consult the metadata associated with the recovery script to determine how to handle failure recovery. For example, to handle failure recovery, the rollback and rerun supervisor 110 may halt execution of any scripts scheduled in the job scheduling system 130 and load an appropriate recovery script from the recovery script library 140b.

Figure 2A:
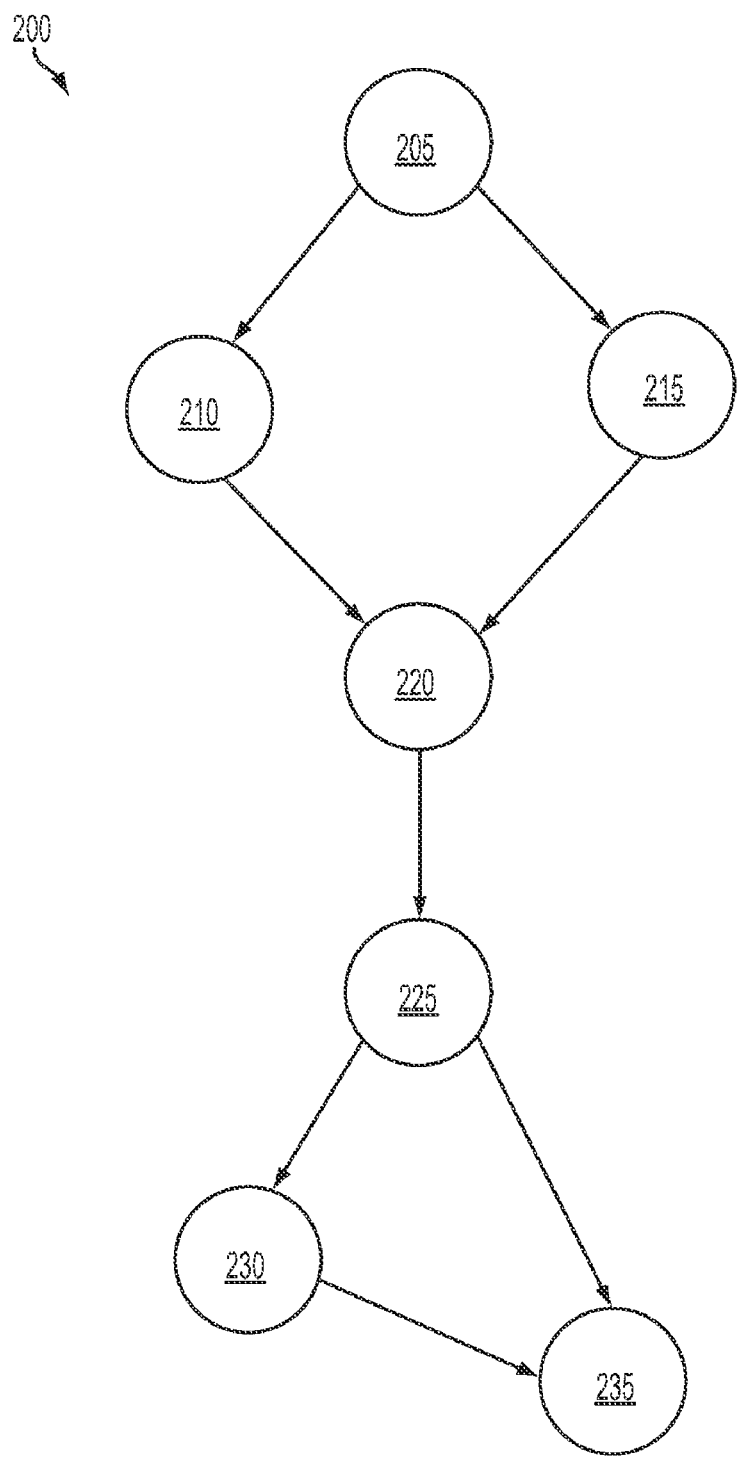
FIGS. 2a-c illustrate various dependency graphs describing exemplary task schedules that include a plurality of jobs, according to one aspect of the invention.

According to various aspects of the invention, FIG. 2a illustrates an exemplary task 200 may comprise a schedule that includes a plurality of jobs to be executed using a job scheduler, which may be linked according to various dependencies defined in a given job scheduling system script, as described in further detail above. As illustrated in FIG. 2a, the exemplary task 200 may include a series of jobs 205-235, which may be linked to one another in a predefined dependency relationship. The task 200 may be represented as a general tree structure, wherein the jobs 205-235 making up task 200 include dependencies based on parent-child relationships. For example, in one implementation, an initiating job 205 may be a parent job with respect to intermediary child jobs 210 and 215, while intermediary jobs 210 and 215 may be parent jobs with respect to an intermediary child job 220.

The various jobs 205-235 in a given task 200 may therefore be linked together according to various dependencies in the form of a directed acyclic graph (DAG). For example, in the exemplary task 200 illustrated in FIG. 2a, intermediary jobs 210 and 215 can only be initiated following successful completion of initiating job 205, while intermediary job 220 can only be initiated following successful completion of each of intermediary jobs 210 and 215. Continuing to traverse the directed acyclic graph, an intermediary job 225 may be initiated following successful completion of intermediary job 220, and intermediary job 230 may be initiated following successful completion of intermediary job 225. Finally, terminating job 235 may be initiated following successful completion of each of intermediary jobs 225 and 230.

As described above, the initiation of any particular one of the jobs 205-235 associated with the scheduled task 200 may be based on an occurrence of one or more external events, with the occurrence of such events being recorded in one or more execution event logs that a rollback and rerun supervisor monitors. In one implementation, the external events may include composition operators that augment the simple dependencies among the various jobs 205-235 illustrated in FIG. 2a. For example, the composition operators may define further dependency relationships among a plurality of child jobs with respect to a common parent, as illustrated in greater detail in FIG. 2b.

Figure 2B:
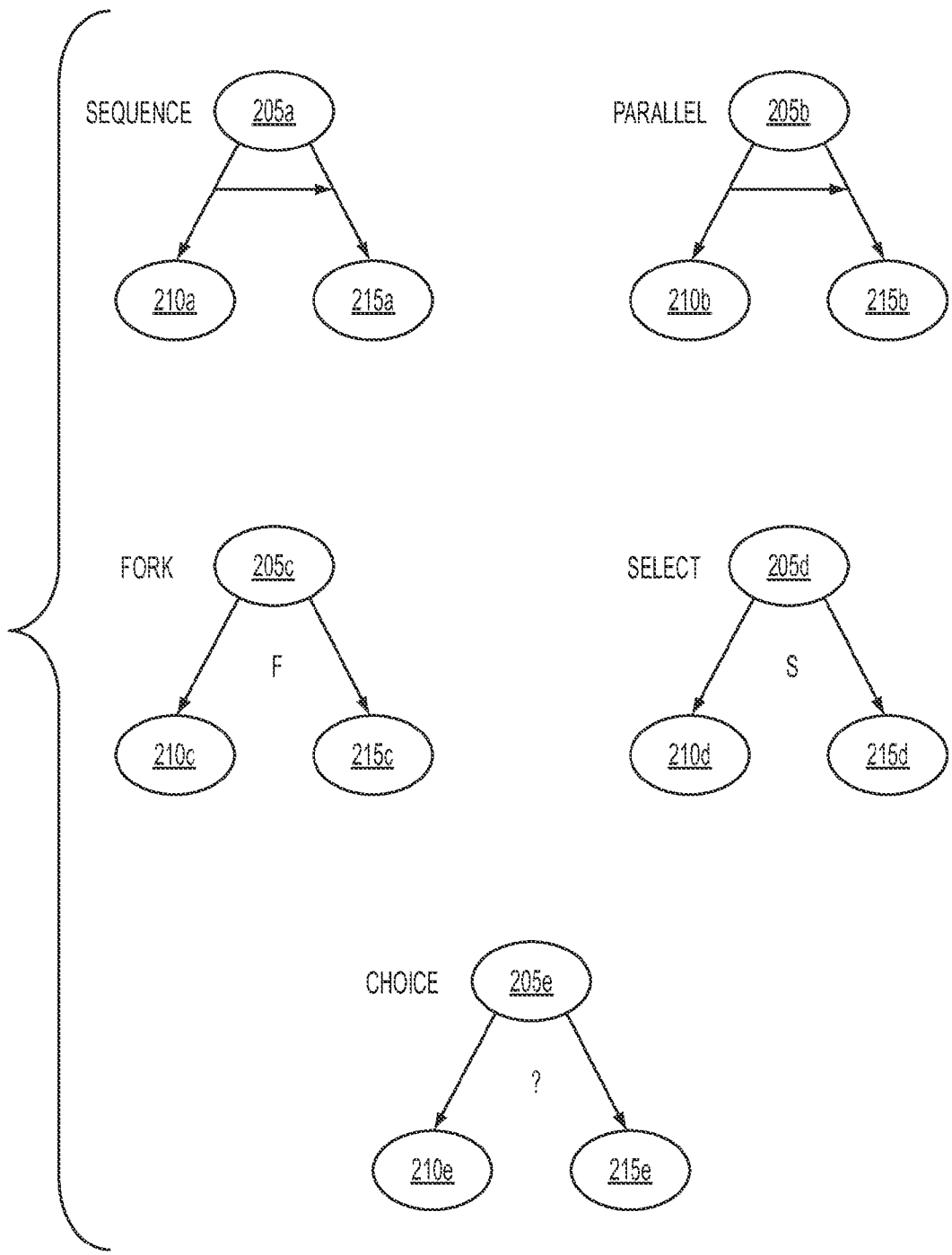

FIG. 2b illustrates various composite tasks in which one or more composite operators define a relationship among a plurality of child jobs with respect to a given parent job. As will be apparent, the composite tasks illustrated in FIG. 2b include various composite operators to specify a manner in which a portion of the jobs illustrated in FIG. 2a may be executed. In particular, FIG. 2a illustrates dependencies between jobs 205-215, wherein child jobs 210 and 215 may only be initiated following successful completion of parent job 205. The composite tasks illustrated in FIG. 2b include further dependencies based on one or more composite operators, which may include a sequence composite operator, a parallel composite operator, a fork composite operator, a select composite operator, and a choice composite operator.

In one implementation, the sequence composite operator may be identified using a directional arrow spanning a plurality of child jobs. The sequence composite operator may specify a sequential relationship between child jobs, where each of the child jobs must be completed in an order starting at the base of the directional arrow and finishing at the head of the directional arrow. Thus, as shown in FIG. 2b, child jobs 210a and 215a may only be initiated following successful completion of parent job 205a, and furthermore, child job 210a must successfully complete prior to execution of child job 215a.

In one implementation, the parallel composite operator may be identified using an undirected line spanning a plurality of child jobs. The parallel composite operator may specify a parallel relationship between child jobs, where each of the child jobs may be initiated in parallel to one another. Thus, as shown in FIG. 2b, child jobs 210b and 215b may only be initiated following successful completion of parent job 205b, and child job 210b and child job 215b may each be initiated in parallel, without restriction as to the sequence of initiation thereof.

In one implementation, the fork composite operator may be identified using an "F" character notation between a plurality of child jobs. The fork composite operator may specify an alternative relationship between child jobs, where the first child job to provide an affirmative signal may be initiated with all other child jobs being ignored. Thus, as shown in FIG. 2b, whichever one of the child jobs 210c and 215c first provides an affirmative signal may be initiated following successful completion of parent job 205c, with the other one of child jobs 210c and job 215c being ignored once the other has been initiated.

In one implementation, the select composite operator may be identified using an "S" character notation between a plurality of child jobs. The select composite operator may specify a selection relationship between child jobs, where each child job has a predicate associated therewith. The predicates associated with the child jobs may be evaluated in a predetermined order, such as from left to right, with the first child having a predicate that evaluates to "true" being selected for initiation. Only the selected child job may be initiated in a select composite task, wherein other child jobs will be ignored when one of the child jobs has been selected, and wherein no child job will be initiated if none of the predicates evaluates to true. Thus, as shown in FIG. 2b, a predicate associated with child job 210d may be evaluated following successful completion of parent job 205d, with child job 210d being initiated and child job 215d being discarded if the predicate associated with child job 210d evaluates to true. If the predicate associated with child job 210d does not evaluate to true, a predicate associated with child job 215d may be evaluated, with child job 215d being initiated if the predicate associated with child job 215d evaluates to true. If neither of the predicates evaluate to true, neither child job 210d nor child job 215d will be initiated.

In one implementation, the choice composite operator may be identified using a "?" character notation between a plurality of child jobs. The choice composite operator may specify a predefined order for initiating the child jobs, such as left to right, or right to left, or otherwise. The first child job in the predefined order may be initiated following successful completion of the parent job, and subsequent jobs may be initiated following the prior job indicating an appropriate occurrence or non-occurrence of a predetermined event (e.g., a successful completion event). Thus, as shown in FIG. 2b, and assuming a left to right order of choice, child job 210e may be initiated following successful completion of parent job 205e, with child job 215e being subsequently initiated when the predetermined event associated therewith has been satisfied.

Furthermore, it will be appreciated that in other task arrangements, such as rollback and rerun tasks, a child job may have a plurality of parent jobs defined a composite task. For example, any given task or composite task executed in the job scheduling system may include a rollback and rerun task description to provide a higher level of control and failure recovery capabilities for the execution thereof. As such, the rollback and rerun supervisor may configure each task or composite task loaded for execution in the job scheduling system to support rollback and rerun in the event that a failure recovery process may be needed. For example, in one implementation, rollback and rerun metadata may be used to augment tasks or composite tasks in one or more of the job scheduling system scripts and/or the recovery scripts. When the tasks or the composite tasks are loaded to the job scheduling system, the rollback and rerun metadata may then be stripped and the underlying task or composite task executed.

Referring back to FIG. 1, further details regarding the deontic reasoning engine 115 illustrated therein are provided. As indicated above, the rollback and rerun supervisor 110 continuously reviews the execution event logs 150, and provides the event logs 150 to the reasoning engine 115. In one implementation, the event logs 150 may be provided to the reasoning engine 115 either on a periodic basis, an interrupt-driven basis, asynchronously, after completion of a scope, stage, or job in a task, or on another basis, as will be apparent. The reasoning engine 115 may compare the event logs 150 against the rollback and rerun metadata associated with each task to determine whether or not the task has failed. If the reasoning engine 115 determines that the task has failed, the reasoning engine 115 may initiate creation of a recovery script to correct the failure, wherein the recovery script may include a task description to rollback and/or rerun previous accomplishments of the failed task.

In one implementation, the rollback and rerun metadata may include a goal having an associated modality based on deontic logic. The goal associated with a given task may be defined to be achieved whenever the underlying task or composite task completes successfully. However, a given task may not necessarily succeed once the goal has been achieved. Rather, the metadata describing a given task may further include a modality specifying a condition that the goal must satisfy in order for the overall to task to succeed. In one implementation, the modality may specify whether the goal must be achieved (i.e., the goal is Obliged), may be achieved (i.e., the goal is Permitted), or must not be achieved (i.e., the goal is Interdicted). Thus, the modality may be referred to as an OPI modality, wherein a given task succeeds if and only if a satisfied goal is consistent with the associated OPI modality. Further, in one implementation, a waiver modality be used to remove, clear, or otherwise waive a requirement associated with an existing OPI modality. Further details regarding deontic logic and OPI modalities may be found in "Coordinating with Obligations," by Barbuceanu, Gray, and Mankovski, in the Proceedings of the 2nd International Conference on Autonomous Agents, which is incorporated herein by reference in its entirety.

As indicated above, each of a plurality of jobs in a given task may be responsible for a discrete and localized function, characteristics of which may depend on the features and capabilities of a job scheduling system that executes the task. For example, in various implementations, the function associated with a given job may include a business process function, a network monitoring function, a network security function, a remote monitoring function, a real-time system control function, or another function, as will be apparent. Furthermore, as described above, the plurality of jobs may relate to one another according to one or more dependency relationships described in one or more directed acyclic graphs and/or one or more composite operators. Thus, the success of the task may be defined as a function of the success or failure of the plurality of jobs, the composite operators among the plurality of jobs, and an OPI modality associated with a goal for the task. In addition, as will be apparent, each of the plurality of jobs within a given task may be defined as a "sub-task," whereby individual jobs may further include one or more sub-jobs, one or more composite operators, and/or a goal having an associated OPI modality.

Figure 2C:
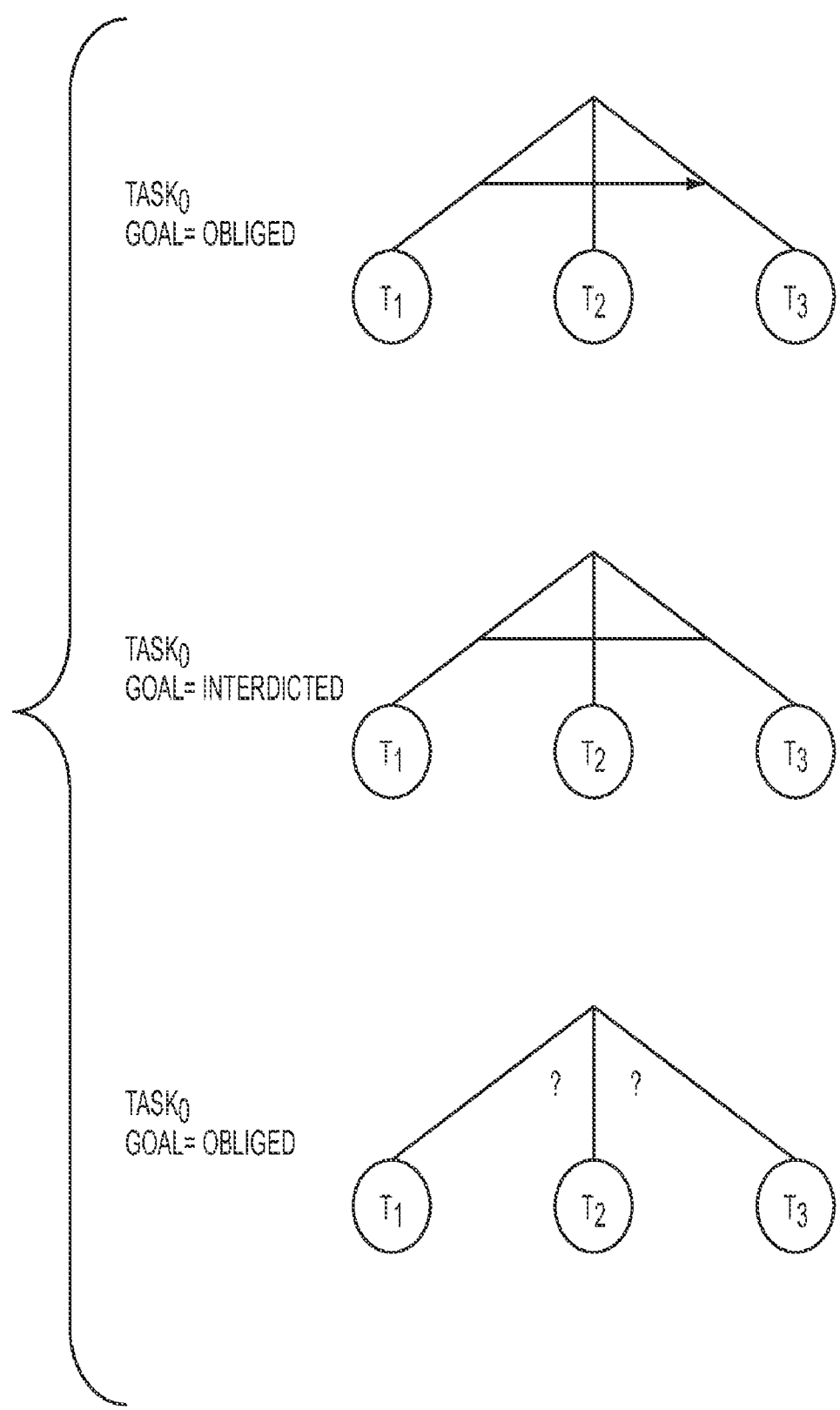

For example, FIG. 2c illustrates various exemplary compositions of a task, referred to herein as $Task_0$, which includes a plurality of sub-tasks, referred to herein as $Task_1$, $Task_2$, and $Task_3$. As indicated above, the success of the $Task_0$ may be defined as a function of the success or failure of $Task_1$, $Task_2$, and $Task_3$, the composite operators among $Task_1$, $Task_2$, and $Task_3$, and an OPI modality associated with a goal for $Task_0$.

In the first example illustrated in FIG. 2c, $Task_0$ may include a sequential composition for $Task_1$, $Task_2$, and $Task_3$, and may further include a goal having an OPI modality of Obliged. Because $Task_0$ has an Obliged goal in this example, whereby the goal must be achieved, $Task_0$ will be deemed to have succeeded if and only if $Task_1$, $Task_2$, and $Task_3$ all succeed in sequence.

In the second example illustrated in FIG. 2c, $Task_0$ may include a parallel composition for $Task_1$, $Task_2$, and $Task_3$, and may further include a goal having an OPI modality of Interdicted. Because $Task_0$ has an Interdicted goal in this example, whereby the goal must not be achieved, $Task_0$ will be deemed to have failed if $Task_1$, $Task_2$, and $Task_3$ all succeed, regardless of the order in which $Task_1$, $Task_2$, and $Task_3$ succeed (i.e., because $Task_1$, $Task_2$, and $Task_3$ can be executed in parallel).

In the final example illustrated in FIG. 2c, $Task_0$ may include a choice composition for $Task_1$, $Task_2$, and $Task_3$, and may further include a goal having an OPI modality of Obliged. Because $Task_0$ has an Obliged goal in this example, whereby the goal must be achieved, $Task_0$ will be deemed to have succeeded if any one of $Task_1$, $Task_2$, and $Task_3$ all (i.e., because any one of $Task_1$, $Task_2$, and $Task_3$ may be chosen to achieve $Task_0$).

Thus, in one implementation, the deontic reasoning engine may monitor the execution status of a given task to determine whether execution of the task has resulted in failure or success. In particular, the deontic reasoning engine may determine whether the task has resulted in failure or success based on a goal for the task, an OPI modality for the goal, and information contained in one or more execution event logs, as provided in the Table below.

| OPI Modality | Goal Unachieved | Goal Achieved |
|---|---|---|
| Obliged | Task Failure | Task Success |
| Permitted | Neutral | Neutral |
| Interdicted | Task Success | Task Failure |

In one implementation, if a given task or sub-task fails to complete the associated goal in a manner consistent with the OPI modality, the deontic reasoning engine may attempt to complete the goal if one or more other jobs can be identified and executed to achieve the goal in a manner consistent with the OPI modality. Thus, in one implementation, a library of recovery scripts may include various task descriptions to achieve the goal in such a manner, and the deontic reasoning engine may dynamically configure the recovery scripts based on the relevant goal and OPI modality. For example, in one implementation, the task descriptions in the recovery scripts may be designed to achieve a goal identically matching the goal of the failed task, to achieve a goal exactly opposite to the goal of the failed task, or to rollback the goal that the failed task has achieved (e.g., when the goal has an Interdicted modality).

In one implementation, one or more assertion values may be associated with the goal associated with a given task to assist the deontic reasoning engine in monitoring the execution status of the task. The assertion values may include one or more of achieving, alternatives, unachieving (or rollback), and reachieving (or rerun), each of which may define particular characteristics of the execution status for the task. The achieving assertion value may indicate that the goal has yet to be achieved. The alternatives assertion value may indicate an availability of alternative tasks to achieve the goal of a task that has failed. The unachieving (or rollback) assertion value may indicate whether a task can be rolled back after completing. The reachieving (or rerun) assertion value may indicate whether a task can be rerun to completion after previous completion and rollback.

In addition, the rollback and rerun metadata, which may include the various assertion values referred to above, may further include an OPI modality specifying the manner in which the deontic reasoning engine may handle failure of the task or composite task. In particular, in one implementation, the rollback and rerun metadata may include an unachieving (or rollback) OPI modality, a reachieving (or rerun) OPI modality, and/or an alternatives OPI modality. In one implementation, the OPI modality for the goal associated with the overall task may also be used to provide an OPI modality for the achieving assertion value. Thus, when failure of the task occurs, the rollback DPI modality may indicate whether rolling back the failed task is Obliged, Permitted, or Interdicted, the rerun OPI modality may similarly indicate whether rerunning the failed task is Obliged, Permitted, or Interdicted, and the alternatives DPI modality may further indicate whether execution of alternative tasks is Obliged, Permitted, or Interdicted.

For example, when the deontic reasoning engine determine that a task has failed to achieve the associated goal in a manner consistent with the OPI modality (e.g., because the task failed to achieve an Obliged goal, or because the task achieved an Interdicted goal), the rollback and rerun supervisor may halt execution of the task and attempt to initiate recovery from the failure. If the rollback OPI modality indicates that rollback is Obliged, the rollback and rerun supervisor may search for a recovery script having a goal to rollback the failed task and configure the script for execution. If no suitable recovery script can be identified, the rollback and rerun supervisor may determine that recovery is not possible and the task therefore fails.

In one implementation, as illustrated in FIGS. 3a-c, the deontic reasoning engine may be used to cancelling one or more upstream goals when a completed task has been cancelled. As described above, a scheduled task may generally fail when execution event logs associated with the task indicate that the task fails to achieve a goal associated with an OPI modality. Another form of failure may arise when a task achieves a goal in a manner consistent with the OPI modality and the goal is then altered after the task has completed.

For example, as shown in FIG. 3a, a $Task_0$ may include a sequence of tasks, including a $Task_1$, $Task_2$, and a $Task_3$. $Task_1$ and $Task_2$ have achieved respective Obliged goals, and $Task_3$ may be under execution. Because the sequence of $Task_1$, $Task_2$, and $Task_3$ has yet to complete, the Obliged goal for $Task_0$ remains unattempted. Referring now to FIG. 3b, if cancellation of the goal associated with $Task_1$ occurs (e.g., by some other task running in parallel to $Task_0$), $Task_0$ may be in an inconsistent state with respect to the OPI modalities of $Task_1$, $Task_2$, and $Task_3$. In particular, the state may be inconsistent because the goal associated $Task_1$ is an Obliged goal, and the goal associated with $Task_2$ depends on the goal associated with $Task_1$ being achieved.

Thus, when a task fails in the manner described above in reference to FIGS. 3a-b, cancellation of the goal associated with $Task_1$ may be reported to the rollback and rerun supervisor via the execution and event logs. When the rollback and rerun supervisor detects the inconsistency, execution of $Task_0$ may be halted and the rollback and rerun supervisor may then determine that $Task_2$ must also be rolled back (i.e., because the goal associated with $Task_2$ depends on the goal associated with $Task_1$). In order to rollback both $Task_1$ and $Task_2$, the rollback and rerun supervisor may locate one or more rollback tasks in the recovery script library having goals defined to rollback the goal associated with $Task_1$ and $Task_2$, as shown in the rollback sequence illustrated in FIG. 3c.

Assuming the rollback tasks for $Task_1$ and $Task_2$ have the appropriate goals, the rollback and rerun supervisor may compose the rollback sequence illustrated in FIG. 3c, where $Task_2$ may be rolled back and $Task_1$ may be subsequently rolled back. In one implementation, when rerun metadata associated with $Task_0$ indicates that rerun is Obliged or Permitted, the rollback and rerun supervisor may reload and resume execution of $Task_0$ once the rollback sequence has completed successfully.

In addition, FIGS. 3a-b further indicate that rollback of $Task_2$ has a Permitted OPI modality (rather than Obliged), whereby the rollback and rerun supervisor may be able to handle recovery even if no task described in the recovery script library has a goal of rolling back $Task_2$. For example, if no script with the goal of rolling back $Task_2$ can be found, a task with a goal of only rolling back $Task_1$ may be appropriately used.

Furthermore, FIG. 3c indicates that the tasks responsible for rollback of $Task_1$ and $Task_2$ have an Interdicted OPI modality, meaning that the rollback and rerun supervisor will not be able to resume execution of $Task_0$ if a failure in executing the rollback tasks occurs. If such a failure occurs, the rollback and rerun supervisor may attempt to recover from such failure using a recovery script that has an Obliged goal of rolling back a failed recovery.

Figure 4:
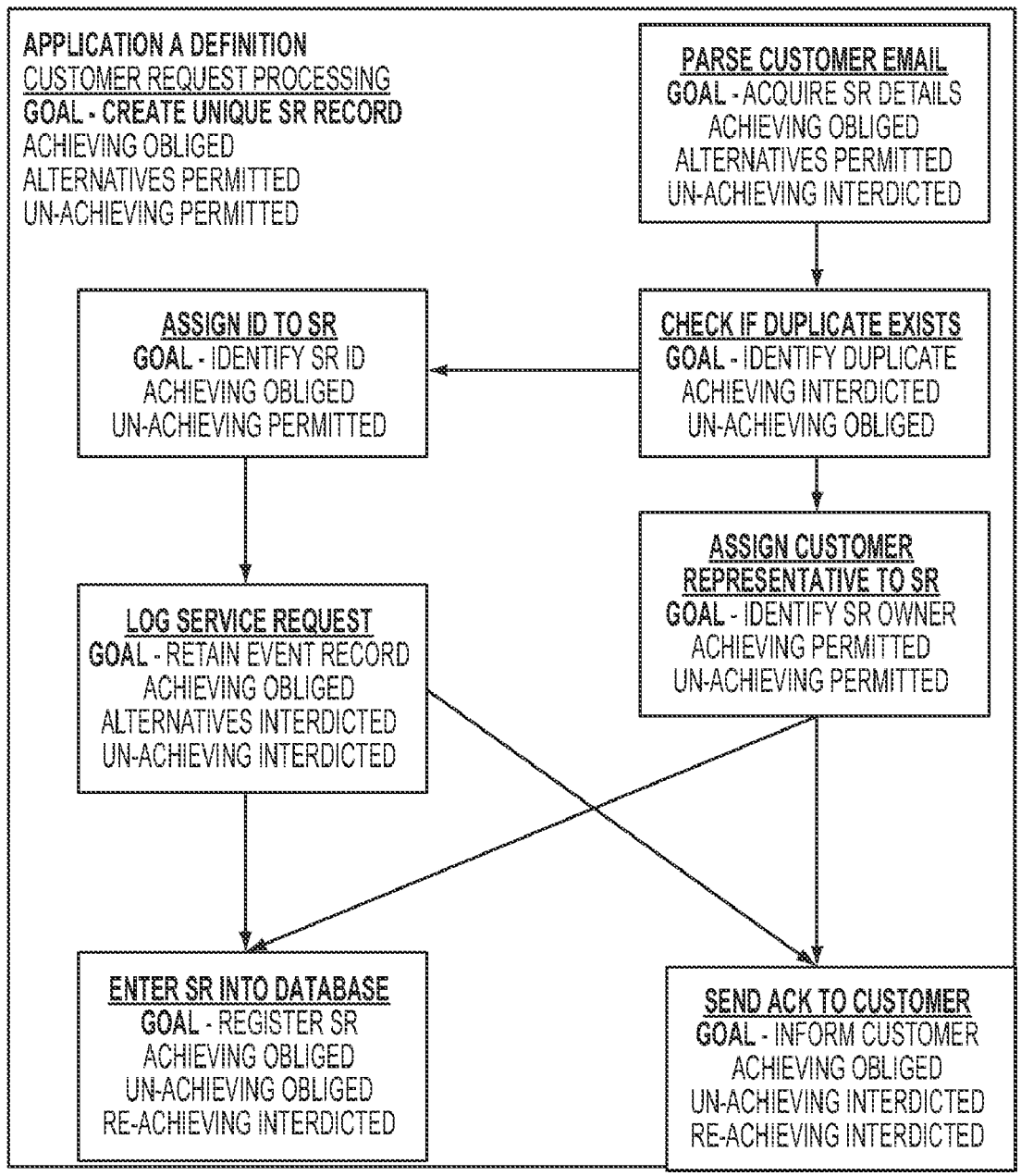
FIG. 4 illustrates an exemplary task schedule for processing a customer request, according to one aspect of the invention.

In an exemplary implementation, FIG. 4 may illustrate a task description having an overall goal of processing a customer service request (SR). The task may operate under an initial assumption that the service request will be provided via an email, wherein the task includes a plurality of jobs having respective goals to parse the customer email to retrieve particulars of the request; check whether any duplicate service request from the customer exist, assign an identification (ID) number to the service request, assign a customer representative to the service request, log a formal service request with the system, send an acknowledgement to the customer, and enter the service request into a database. In one implementation, a graph representation for the task can be stored in a script library as a series of linked records. In one implementation, the graphs may be traversed and the contents thereof examined using any suitable tree-traversal technique, as will be apparent (e.g., breadth-wise, depth-wise, etc.).

Figure 5:
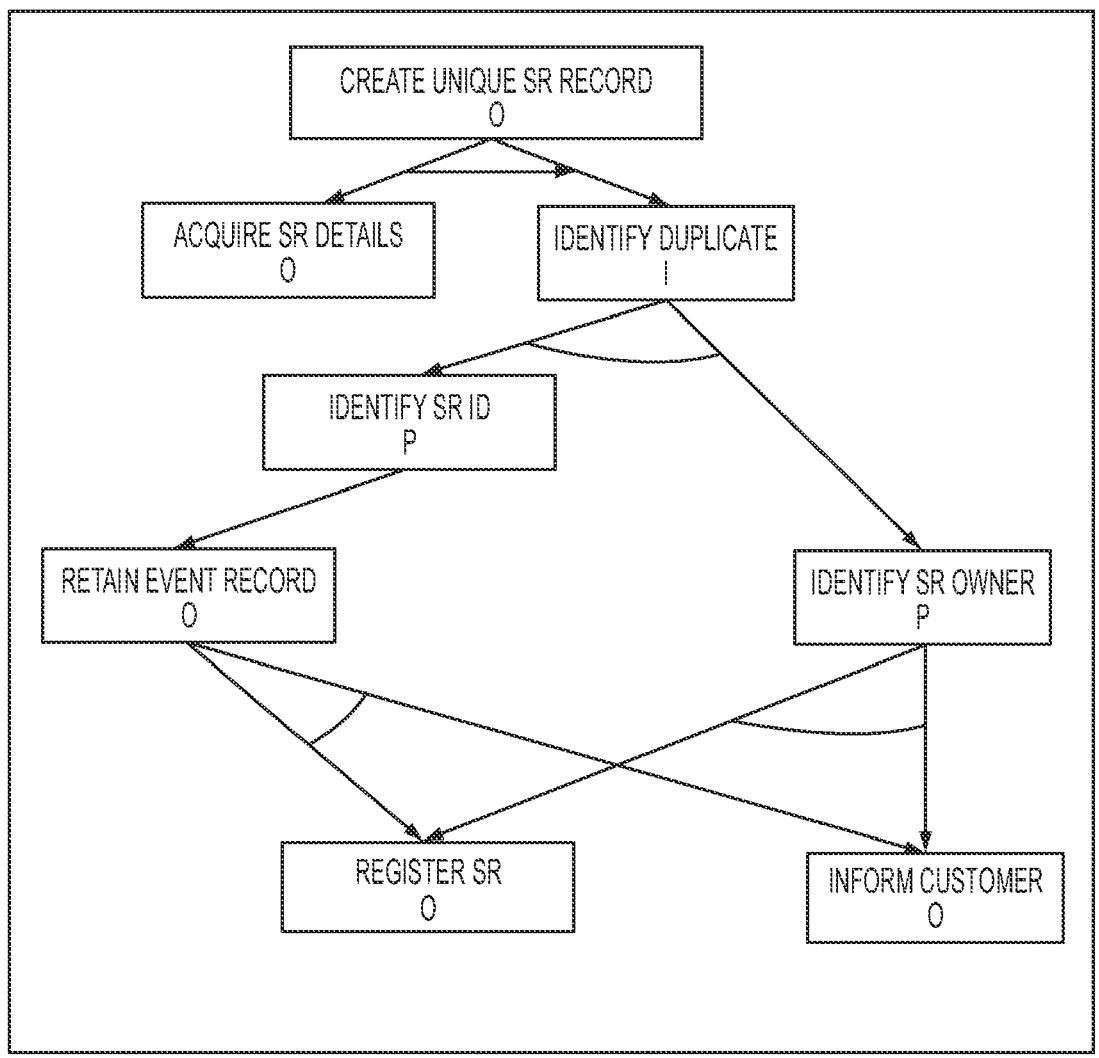
FIGS. 5-6 respectively illustrate an exemplary achieve and unachieve assertion graph for the customer request illustrated in FIG. 4, according to one aspect of the invention.

As shown in FIG. 4, the various jobs within the task may have rollback and rerun metadata indicating whether achieving the respective goals are Obliged, Permitted, or Interdicted, and similar metadata may be provided indicating whether unachieving (or rolling back) and reachieving (or rerunning) of the respective tasks are Obliged, Permitted, or Interdicted. Thus, in one implementation, the rollback and rerun supervisor may configure an appropriate script in one or more of the script libraries to schedule execution of the task in the job scheduling system. For example, the script may be configured to include a composite task as illustrated in FIG. 5, where parsing the customer email to acquire details of the service request and identifying any duplicates depend on one another according to a sequence composite operator. The remainder of the composite task illustrated in FIG. 5 may similarly be configured to follow the task description provided in FIG. 4, with each job within the task having a goal and an OPI modality associated therewith.

When one or more of the jobs in the task fail, the rollback and rerun supervisor may attempt recovery through configuring a rollback job to unachieve the effects of the failed job. The rollback job may be configured to have a starting point corresponding to one or more goals that one or more jobs have already achieved. To configure the rollback job, the reasoning engine may examine the relationships among the various failed jobs within the task and the associated rollback OPI modalities to determine which of the previously accomplished goals of the job must be rolled back, may be rolled back, or must not be rolled back. Assuming that appropriate rollback jobs are found for each of the failed jobs that are Obliged or Permitted to be rolled back, the reasoning engine may configure a recovery script to rollback effects of the failed jobs.

In one implementation, the rollback jobs in the recovery script may be executed in a reverse order with respect to the original jobs, whereby the most recent failed job has a rollback job executed first. In addition, relationships among one or more rollback jobs in the recovery script may be defined to match job goals and associated OPI modalities. The job scheduling system may then initiate execution of the recovery script. As the rollback jobs in the recovery script complete, a separate execution event log may be generated for the rollback jobs. The rollback and rerun supervisor may then receive the execution event logs and compare information contained therein against the goals and OPI modalities for the original task to determine whether or not the recovery script has successfully completed. It will, be appreciated that, in one implementation, one or more further iterations of a recovery script including one or more rollback jobs may need to be executed if one or more of the rollback jobs in the recovery script fail.

After the rollback jobs in the recovery script have completed, the rollback and rerun supervisor may evaluate whether any effects of the rollback jobs resulted in one or more jobs needing to be executed again (i.e., rerun). In such a case, a recovery script including one or more rerun jobs may be configured after examining the status of goals achieved from executing the rollback jobs in the first recovery script. For example, in some cases a rollback job in a recovery script may rollback not only the failed job, but also additional jobs that were previously in a state of being successfully accomplished. In a manner similar to configuring the rollback jobs in the first recovery script, the reasoning engine can configure one or more rerun jobs in a second recovery script. For a rerun recovery script, the reasoning engine may identify one or more rerun jobs that have goals matching the goals of any jobs that need to be rerun because of the execution of the rollback recovery script, where rerun for such jobs may be Obliged, Permitted, or Interdicted.

When the rerun recovery script has been configured, the rollback and rerun supervisor may provide the script to the job scheduling system for execution. If the job scheduling system completes execution of the rerun recovery script and the reasoning engine determines that all original goals of Obliged rerun jobs have been achieved, the rollback and rerun supervisor may determine that recovery from the original task failure has succeeded.

Figure 6:
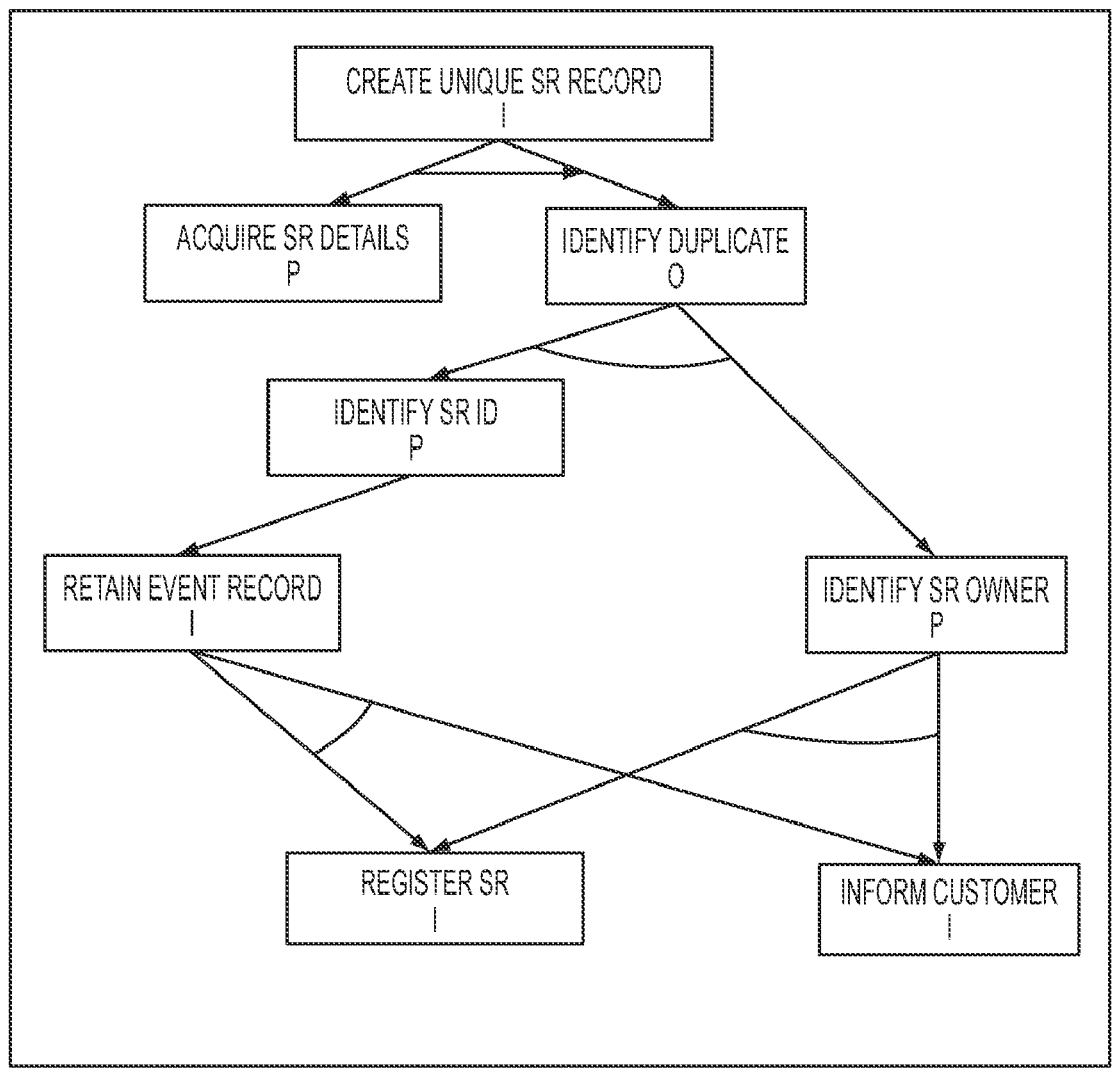
Figure 7:
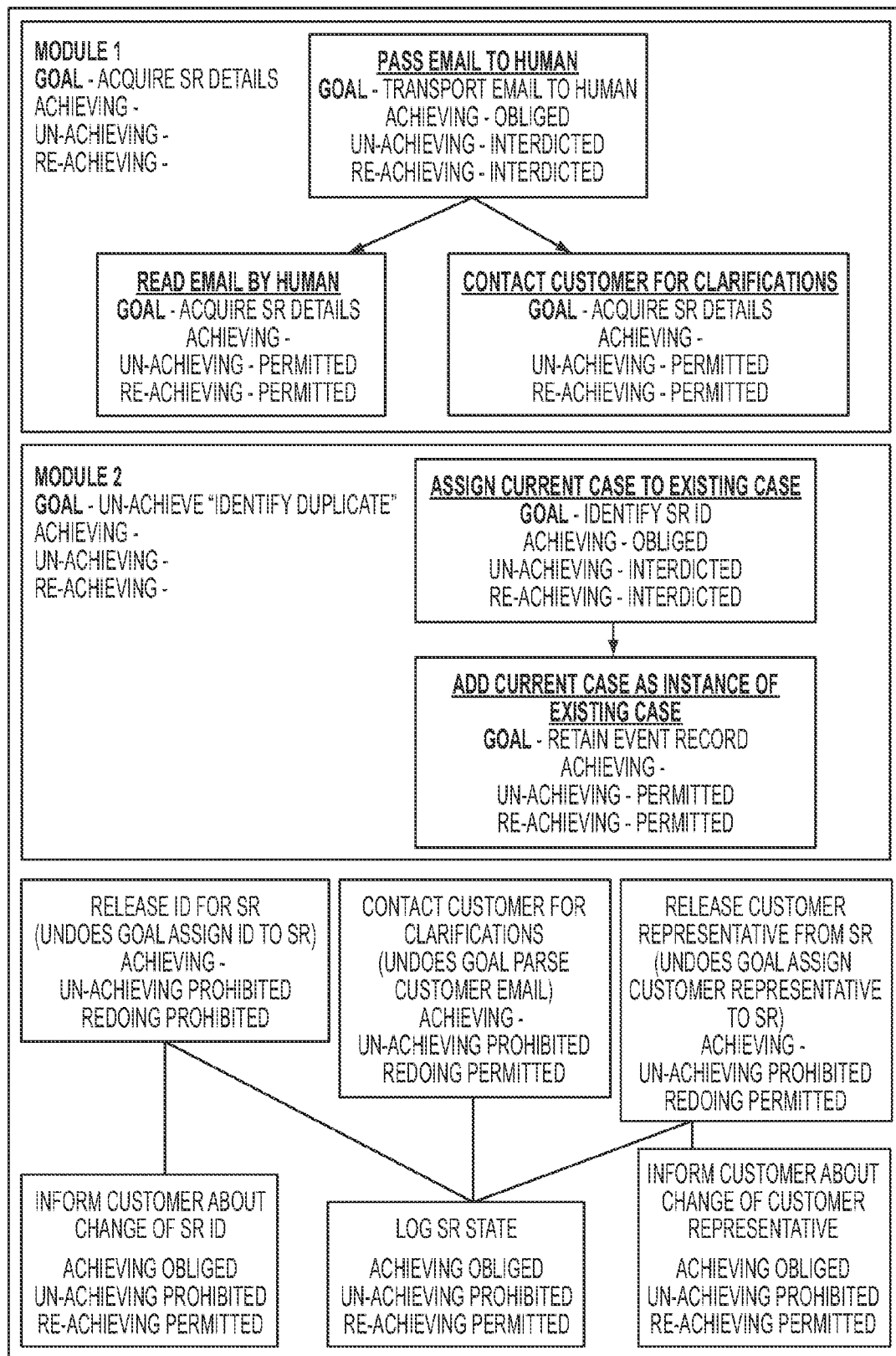
FIG. 7 illustrates an exemplary task schedule for rolling back and rerunning the customer request illustrated in FIG. 5, according to one aspect of the invention.

For example, FIG. 6 illustrates an exemplary recovery script that includes a plurality of rollback jobs in a composite rollback task. When the reasoning engine determines that execution of the task illustrated in FIG. 5 has failed, the unachieve OPI modalities may be extracted for each of the jobs to create the composite rollback task illustrated in FIG. 6. The composite rollback task may include a plurality of rollback jobs that indicate the already achieved goals that have to be rolled back because a downstream job failed. For example, the job designed to "Identify Duplicate" may have a goal with an Interdicted modality, where if the goal is successfully achieved, the job has actually failed. In such a case, rolling back the accomplishments of the Identify Duplicate job is Obliged, where the Identify Duplicate job may be rolled back using a recovery script that has a goal of removing any identified duplicates. For example, referring to FIG. 7, one suitable task in the library may be found in. Module 2, which has a goal designed to unachieve the "Identify Duplicate" task.

Figure 8:
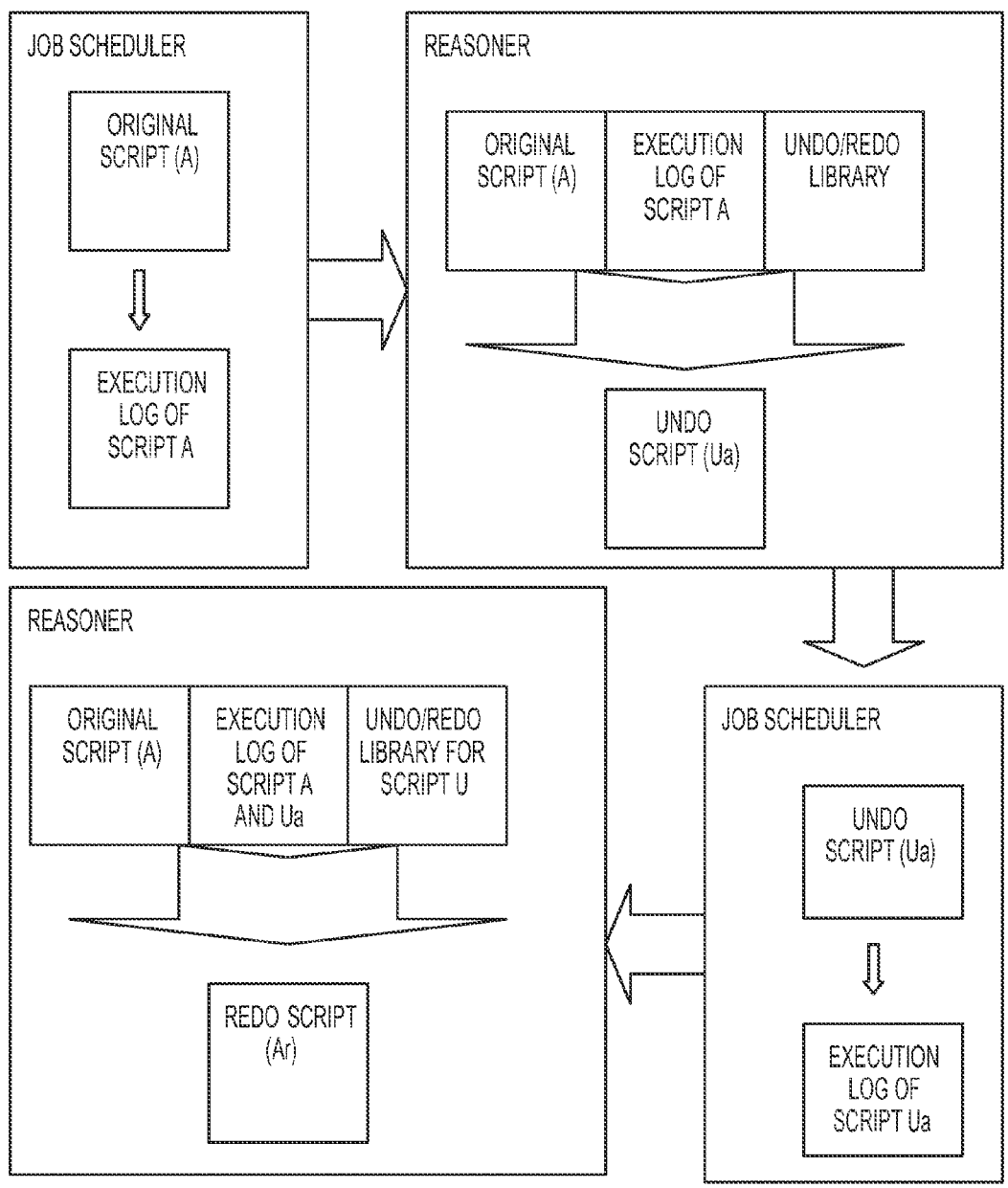
FIG. 8 illustrates an exemplary method for modifying execution of scripts for a job scheduler, according to one aspect of the invention.

When the rollback recovery script has been configured, the rollback recovery script may be executed in the job scheduling system. As illustrated in FIG. 8, the rollback recovery script may be noted as script Ua. As the rollback recovery script executes, an execution event log may be generated, and the rollback and rerun supervisor may examine the event log to determine whether the rollback recovery script has succeeded or failed. In one implementation, the rollback recovery script may be determined to have successfully completes execution if a previously accomplished Interdicted goal has been successfully rolled back.

As noted above, the rollback recovery script may achieve other goals during the course of executing the rollback jobs. As such, when the other goals are consistent with the goals of the original jobs in the failed task and the associated OPI modalities, it will be apparent that jobs sharing the same goals as achieved by the rollback recovery script do not have to be executed. When one or more previously achieved goals have been rolled back, however, a rerun recovery script can be generated and executed to re-achieve such goals, where the rerun recovery script may be noted in FIG. 8 as script Ar.

In one implementation, the rollback and rerun supervisor may further use a process direction pointer to track whether execution of a given task or composite task is currently progressing in a forward direction (i.e., towards an original goal for the task), or a backward direction (i.e., away from the original goal for task, which may typically be the case during execution of a rollback recovery script). The process direction pointer may thus be used to determine whether execution of a rollback recovery script or a rerun recovery script is necessary, or whether the script associated with the original task can proceed.

Implementations of the invention may be made in hardware, firmware, software, or various combinations thereof. The invention may also be implemented as instructions stored on a machine-readable medium, which may be read and executed by one or more processors. A machine-readable medium may include various mechanisms for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic has been described in connection with an aspect or implementation, it will be understood that such feature, structure, or characteristic may be included in connection with other aspects or implementations, whether or not explicitly described. Thus, various changes and modifications may be made to the preceding description without departing from the scope or spirit of the invention, and the specification and drawings should therefore be regarded as exemplary only, and the scope of the invention determined solely by the appended claims.

What is claimed is:

1. A system for modifying execution of scripts for a job scheduler using deontic logic, comprising:
    a job scheduler configured to execute a schedule that includes at least one task associated with a goal having a first deontic modality associated therewith and create one or more event logs that include information associated with executing the at least one task in the schedule; and
    a rollback and rerun supervisor communicatively coupled to the job scheduler, wherein the rollback and rerun supervisor is configured to:
        determine whether the at least one task has succeeded or failed based on whether the information in the one or more event logs indicates that the goal associated with the at least one task has been achieved in a manner consistent with the first deontic modality;
        determine a second deontic modality associated with recovering from failure of the at least one task if the information in the one or more event logs indicates that the at least one task has failed to achieve the goal in a manner consistent with the first deontic modality; and
        load a recovery script to the job scheduler based on the second deontic modality associated with recovering from failure of the at least one task, wherein the recovery script loaded to the job scheduler includes a task description designed to achieve the goal associated with the at least one task in a manner consistent with the first deontic modality.

2. The system of claim 1, wherein to determine whether the at least one task has succeeded or failed, the rollback and rerun supervisor is further configured to:
    determine that the at least one task has succeeded if the first deontic modality comprises an Obliged modality and the information in the one or more event logs indicates that the goal has been achieved; and
    determine that the at least one task has failed if the first deontic modality comprises the Obliged modality and the information in the one or more event logs indicates that goal has not been achieved.

3. The system of claim 2, wherein the task description includes one or more tasks designed to achieve the goal if the first deontic modality comprises the Obliged modality and the information in the one or more event logs indicates that the goal has not been achieved.

4. The system of claim 1, wherein to determine whether the at least one task has succeeded or failed, the rollback and rerun supervisor is further configured to:
    determine that the at least one task has succeeded if the first deontic modality comprises an Interdicted modality and the information in the one or more event logs indicates that the goal has not been achieved; and
    determine that the at least one task has failed if the first deontic modality comprises the Interdicted modality and the information in the one or more event logs indicates that the goal has been achieved.

5. The system of claim 4, wherein the task description includes one or more tasks designed to rollback the goal if the first deontic modality comprises the Interdicted modality and the information in the one or more event logs indicates that the goal has been achieved.

6. The system of claim 1, wherein to determine whether the at least one task has succeeded or failed, the rollback and rerun supervisor is further configured to determine that the at least one task has succeeded if the first deontic modality comprises a Permitted modality whether or not the information in the one or more event logs indicates that the goal has been achieved.

7. The system of claim 1, wherein the second deontic modality associated with recovering from failure of the at least one task includes a rollback modality.

8. The system of claim 1, wherein the second deontic modality associated with recovering from failure of the at least one task includes a rerun modality.

9. The system of claim 7, wherein the rollback modality indicates whether rolling back the failure of the at least one task is Obliged, Permitted, or Interdicted.

10. The system of claim 8, wherein the rerun modality indicates whether rerunning the at least one task is Obliged, Permitted, or Interdicted.

11. The system of claim 1, wherein the rollback and rerun supervisor is further configured to cancel one or more upstream goals associated with the schedule if the information in the one or more event logs indicates that the at least one task has completed or that the at least one task has been cancelled.

12. A method for executing a job schedule, comprising:
defining a schedule to execute a plurality of tasks;
executing a first one of the plurality of tasks according to the defined schedule, wherein the first executed task includes a first goal having an Interdicted deontic modality;
generating an execution event log that includes information to indicate whether the first goal having the Interdicted deontic modality has been achieved based on an execution status associated with the first executed task; and
attempting to identify a first recovery schedule to rollback the first executed task if the information in the execution event log indicates that the first goal having the Interdicted deontic modality has been achieved, wherein the first recovery schedule includes a first recovery task associated with a goal having an Obliged deontic modality that requires a rollback to unachieve the first goal having the Interdicted deontic modality.

13. The method of claim 12, further comprising:
executing the first recovery task according to the first recovery schedule;
generating a recovery event log that includes information to indicate whether the goal having the Obliged deontic modality has achieved the required rollback to unachieved the first goal having the Interdicted deontic modality based on an execution status associated with the first recovery task; and
determining whether the first recovery schedule has succeeded or failed based on whether the information in the recovery event log indicates that the first recovery task has achieved the required rollback.

14. The method of claim 13, wherein the first recovery schedule further includes at least one rerun job to rerun the first executed task associated with the unachieved first goal having the Interdicted deontic modality and the method further comprises executing the at least one rerun job if the information in the recovery event log indicates that the first recovery schedule task has achieved the required rollback.

15. The method of claim 12, further comprising:
executing a second one of the plurality of tasks according to the defined schedule, wherein the second executed task includes a second goal having an Obliged deontic modality and the generated execution event log further includes information to indicate whether the second goal having the Obliged deontic modality has been achieved based on an execution status associated with the second executed task; and
attempting to identify a second recovery schedule to achieve the second goal associated with the second executed task if the information in the execution event log indicates that the second goal having the Obliged deontic modality has not been achieved, wherein the second recovery schedule includes a second recovery task to achieve the second goal having the Obliged deontic modality.

16. The method of claim 15, further comprising resuming execution associated with the plurality of tasks according to the defined schedule if the first recovery schedule has successfully unachieved the first goal having the Interdicted deontic modality and the second recovery scheduled has successfully achieved the second goal having the Obliged deontic modality.

17. A method for modifying execution of scripts for a job scheduler using deontic logic, comprising:
using a job scheduler to execute a schedule that includes a composite task having multiple dependent sub-tasks and one or more composite operators to define a manner to execute the multiple dependent sub-tasks, wherein at least one of the multiple dependent sub-tasks includes a goal having a first deontic modality associated therewith;
creating, via the job scheduler, an event log that includes information associated with executing the multiple dependent sub-tasks associated with the composite task;
determining, at a rollback and rerun supervisor, whether the composite task has succeeded or failed based on whether the information in the event log indicates that the goal associated with the at least one dependent sub-task has been achieved in a manner consistent with the first deontic modality;
determining, at the rollback and rerun supervisor, a second deontic modality to recover from failure associated with the composite task if the information in the event log indicates that the at least one dependent sub-task has failed to achieve the goal associated therewith in a manner consistent with the first deontic modality; and
loading, via the rollback and rerun supervisor, a recovery script to the job scheduler based on the second deontic modality to recover from the failure associated with the composite task, wherein the loaded recovery script includes a task description designed to achieve the goal associated with the at least one dependent sub-task in a manner consistent with the first deontic modality.

18. The method of claim 17, wherein the one or more composite operators include a sequence operator that defines a predetermined order in which to execute the multiple dependent sub-tasks.

19. The method of claim 17, wherein the one or more composite operators include a parallel operator that permits the multiple dependent sub-tasks to be executed in parallel to one another.

20. The method of claim 17, wherein the one or more composite operators include a fork operator that only permits a first one of the multiple dependent sub-tasks that provides an affirmative signal to be executed.

21. The method of claim 17, wherein the one or more composite operators include a select operator that provides a predicate to evaluate the multiple dependent sub-tasks in a predetermined order and select a first one of the multiple dependent sub-tasks that evaluates the predicate to true to be executed.

22. The method of claim 17, wherein the one or more composite operators include a choice operator that defines a first one of the multiple dependent sub-tasks to initiate a predetermined event associated with the first dependent sub-task to control initiating subsequent ones of the multiple dependent sub-tasks.

23. A method for modifying execution of scripts for a job scheduler using deontic logic, comprising:
using a job scheduler to execute a schedule that includes at least one task associated with a goal having a first deontic modality associated therewith, wherein the job scheduler creates one or more event logs that include information associated with executing the at least one task in the schedule;
determining, at a rollback and rerun supervisor communicatively coupled to the job scheduler, whether the at least one task has succeeded or failed based on whether the information in the one or more event logs indicates that the goal associated with the at least one task has been achieved in a manner consistent with the first deontic modality;

determining, at the rollback and rerun supervisor, a second deontic modality associated with recovering from failure of the at least one task if the rollback and rerun supervisor determines that the information in the one or more event logs indicates that the at least one task has failed to achieve the goal in a manner consistent with the first deontic modality; and loading, via the rollback and rerun supervisor, a recovery script to the job scheduler based on the second deontic modality associated with recovering from failure of the at least one task, wherein the recovery script loaded to the job scheduler includes a task description designed to achieve the goal associated with the at least one task in a manner consistent with the first deontic modality.

24. The method of claim 23, wherein determining whether the at least one task has succeeded or failed includes:
determining that the at least one task has succeeded if the first deontic modality comprises an Obliged modality and the information in the one or more event logs indicates that the goal has been achieved; and
determining that the at least one task has failed if the first deontic modality comprises the Obliged modality and the information in the one or more event logs indicates that the goal has not been achieved.

25. The method of claim 24, wherein the task description includes one or more tasks designed to achieve the goal if the first deontic modality comprises the Obliged modality and the information in the one or more event logs indicates that the goal has not been achieved.

26. The method of claim 23, wherein determining whether the at least one task has succeeded or failed includes:
determining that the at least one task has succeeded if the first deontic modality comprises an Interdicted modality and the information in the one or more event logs indicates that the goal has not been achieved; and
determining that the at least one task has failed if the first deontic modality comprises the Interdicted modality and the information in the one or more event logs indicates that the goal has been achieved.

27. The method of claim 26, wherein the task description includes one or more tasks designed to rollback the goal if the first deontic modality comprises the Interdicted modality and the information in the one or more event logs indicates that the goal has been achieved.

28. The method of claim 23, wherein determining whether the at least one task has succeeded or failed includes determining that the at least one task has succeeded if the first deontic modality comprises a Permitted modality whether or not the information in the one or more event logs indicates that the goal has been achieved.

29. The method of claim 23, wherein the second deontic modality associated with recovering from failure of the at least one task includes a rollback modality.

30. The method of claim 29, wherein the rollback modality indicates whether rolling back the failure of the at least one task is Obliged, Permitted, or Interdicted.

31. The method of claim 23, wherein the second deontic modality associated with recovering from failure of the at least one task includes a rerun modality.

32. The method of claim 31, wherein the rerun modality indicates whether rerunning the at least one task is Obliged, Permitted, or Interdicted.

33. The method of claim 23, further comprising cancelling, by the rollback and rerun supervisor, one or more upstream goals associated with the schedule if the information in the one or more event logs indicates that the at least one task has completed or that the at least one task has been cancelled.

34. A system for executing a job schedule, wherein the system comprises one or more processors configured to:
define a schedule to execute a plurality of tasks;
execute a first one of the plurality of tasks according to the defined schedule, wherein the first executed task includes a first goal having an Interdicted deontic modality;
generate an execution event log that includes information to indicate whether the first goal having the Interdicted deontic modality has been achieved based on an execution status associated with the first executed task; and
attempt to identify a first recovery schedule to rollback the first executed task if the information in the execution event log indicates that the first goal having the Interdicted deontic modality has been achieved, wherein the first recovery schedule includes a first recovery task associated with a goal having an Obliged deontic modality that requires a rollback to unachieve the first goal having the Interdicted deontic modality.

35. The system of claim 34, wherein the one or more processors are further configured to:
execute the first recovery task according to the first recovery schedule;
generate a recovery event log that includes information to indicate whether the goal having the Obliged deontic modality has achieved the required rollback to unachieve the first goal having the Interdicted deontic modality based on an execution status associated with the first recovery task; and
determine whether the first recovery schedule has succeeded or failed based on whether the information in the recovery event log indicates that the first recovery task has achieved the required rollback.

36. The system of claim 35, wherein the first recovery schedule further includes at least one rerun job to rerun the first executed task associated with the unachieved first goal having the Interdicted deontic modality and the one or more processors are further configured to execute the at least one rerun job if the information in the recovery event log indicates that the first recovery task has achieved the required rollback.

37. The system of claim 34, wherein the one or more processors are further configured to:
execute a second one of the plurality of tasks according to the defined schedule, wherein the second executed task includes a second goal having an Obliged deontic modality and the generated execution event log further includes information to indicate whether the second goal having the Obliged deontic modality has been achieved based on an execution status associated with the second executed task; and
attempt to identify a second recovery schedule to achieve the second goal associated with the second executed task if the information in the execution event log indicates that the second goal having the Obliged deontic modality has not been achieved, wherein the second recovery schedule includes a second recovery task to achieve the second goal having the Obliged deontic modality.

38. The system of claim 37, wherein the one or more processors are further configured to resume execution associated with the plurality of tasks according to the defined schedule if the first recovery schedule has successfully unachieved the first goal having the Interdicted deontic modality and the second recovery scheduled has successfully achieved the second goal having the Obliged deontic modality.

39. A system for modifying execution of scripts for a job scheduler using deontic logic, wherein the system comprises one or more processors configured to:
   execute a schedule that includes a composite task having multiple dependent sub-tasks and one or more composite operators to define a manner to execute the multiple dependent sub-tasks, wherein at least one of the multiple dependent sub-tasks includes a goal having a first deontic modality associated therewith;
   create an event log that includes information associated with executing the multiple dependent sub-tasks associated with the composite task;
   determine whether the composite task has succeeded or failed based on whether the information in the event log indicates that the goal associated with the at least one dependent sub-task has been achieved in a manner consistent with the first deontic modality;
   determine a second deontic modality to recover from failure associated with the composite task if the information in the event log indicates that the at least one dependent sub-task has failed to achieve the goal associated therewith in a manner consistent with the first deontic modality; and
   load a recovery script based on the second deontic modality to recover from the failure associated with the composite task, wherein the loaded recovery script includes a task description designed to achieve the goal associated with the at least one dependent sub-task in a manner consistent with the first deontic modality.

40. The system of claim 39, wherein the one or more composite operators include a sequence operator that defines a predetermined order in which to execute the multiple dependent sub-tasks.

41. The system of claim 39, wherein the one or more composite operators include a parallel operator that permits the multiple dependent sub-tasks to be executed in parallel to one another.

42. The system of claim 39, wherein the one or more composite operators include a fork operator that only permits a first one of the multiple dependent sub-tasks to provide an affirmative signal to be executed.

43. The system of claim 39, wherein the one or more composite operators include a select operator that provides a predicate to evaluate the multiple dependent sub-tasks in a predetermined order and select a first one of the multiple dependent sub-tasks that evaluates the predicate to true to be executed.

44. The system of claim 39, wherein the one or more composite operators include a choice operator that defines a first one of the multiple dependent sub-tasks to initiate and a predetermined event associated with the first dependent sub-task to control initiating, subsequent ones of the multiple dependent sub-tasks.

* * * * *